(12) United States Patent
Morkovsky et al.

(10) Patent No.: US 6,689,271 B2
(45) Date of Patent: Feb. 10, 2004

(54) PROCESS AND APPARATUS FOR ELECTROCOAGULATIVE TREATMENT OF INDUSTRIAL WASTE WATER

(75) Inventors: Paul E. Morkovsky, Shiner, TX (US); Douglas D. Kaspar, Shiner, TX (US)

(73) Assignee: Kaspar Wire Works, Inc., Shiner, TX (US)

( * ) Notice: Subject to any disclaimer, the term of this patent is extended or adjusted under 35 U.S.C. 154(b) by 110 days.

(21) Appl. No.: 09/961,524

(22) Filed: Sep. 24, 2001

(65) Prior Publication Data

US 2002/0040855 A1 Apr. 11, 2002

Related U.S. Application Data

(63) Continuation-in-part of application No. 09/554,975, filed on Jul. 17, 2000, now Pat. No. 6,294,061, and a continuation-in-part of application No. PCT/US98/24885, filed on Nov. 23, 1998.

(30) Foreign Application Priority Data

| Dec. 21, 1999 | (CL) | ............................................. | 1999-3076 |
| Apr. 24, 2000 | (AU) | ............................................. | 17976/99 |
| Apr. 24, 2000 | (CA) | ............................................. | 2307188 |
| Apr. 24, 2000 | (EP) | ............................................. | 98962821 |
| Apr. 24, 2000 | (MX) | ............................................. | 005011 |
| Apr. 24, 2001 | (CN) | ............................................. | 98811458 |

(51) Int. Cl.$^7$ ............................ C02F 1/461; C02F 1/469
(52) U.S. Cl. ....................... 205/757; 204/239; 204/269; 204/554; 204/571; 204/660; 204/672
(58) Field of Search .................. 205/757; 204/237, 204/269, 554, 571, 660, 672

(56) References Cited

U.S. PATENT DOCUMENTS

| 672,231 | A | 4/1901 | Lacomme |
| 820,113 | A | 5/1906 | Hinkson |
| 2,864,750 | A | 12/1958 | Hughes et al. |
| 3,247,091 | A | 4/1966 | Stuetzer |
| 3,314,872 | A | 4/1967 | Waterman |
| 3,679,556 | A | 7/1972 | Doevenspeck |
| 3,849,281 | A | 11/1974 | Bennett et al. |
| 3,925,176 | A | 12/1975 | Okert |
| 3,964,991 | A | 6/1976 | Sullins |
| 3,975,795 | A | 8/1976 | Kupcikevicius |
| 4,073,712 | A | 2/1978 | Means et al. |
| 4,085,028 | A | 4/1978 | McCallum |
| 4,124,480 | A | 11/1978 | Stevenson |
| 4,175,026 | A | 11/1979 | Houseman |
| 4,293,400 | A | 10/1981 | Liggett |
| 4,339,324 | A | 7/1982 | Haas |
| 4,347,110 | A | 8/1982 | Joyce et al. |
| 4,378,276 | A | 3/1983 | Liggett |
| 4,406,768 | A | 9/1983 | King |

(List continued on next page.)

Primary Examiner—Arun S. Phasge
(74) Attorney, Agent, or Firm—Jackson Walker, LLP

(57) ABSTRACT

An electrocoagulation system for removing contaminants from waste effluents comprising an electrocoagulation reactor having charged and uncharged plates and allowing serial flow of water therethrough. The reactor is connected to a voltage source to charge some of the plates positive and some negative, with uncharged plates between the positive and negative plates. The system allows waste water to enter the reactor for coagulation therein, the waste water leaving the reactor to enter a defoam tank for agitation which allows trapped bubbles to rise to the surface of the tank as foam. From the defoam tank, waste water goes through a sludge thickener, to allow sludge to settle at the bottom thereof and waste water is drawn off from the sludge thickener to flow to a clarifier. The pump removes sludge forming at the bottom of clarifier to take it back to the sludge thickener. The sludge is drawn out the bottom of the sludge thickener for transport to a press where most of the water is removed therefrom. Water is drawn off the top of the clarifier for transport to a conventional sewer system, or for reuse.

19 Claims, 20 Drawing Sheets

U.S. PATENT DOCUMENTS

| | | |
|---|---|---|
| 4,500,403 A | 2/1985 | King |
| 4,789,450 A | 12/1988 | Paterson |
| 4,790,923 A | 12/1988 | Stillman |
| 4,872,959 A | 10/1989 | Herbst et al. |
| 4,902,391 A | 2/1990 | Ibbott |
| 5,043,050 A | 8/1991 | Herbst |
| 5,234,555 A | 8/1993 | Ibbott |
| 5,271,814 A | 12/1993 | Metzler |
| 5,302,273 A | 4/1994 | Kemmerer |
| 5,423,962 A | 6/1995 | Herbst |
| 5,458,758 A | 10/1995 | Suchaca |
| 5,549,812 A | 8/1996 | Witt |
| 5,611,907 A * | 3/1997 | Herbst et al. ............... 205/742 |
| 5,928,493 A * | 7/1999 | Morkovsky et al. ........ 205/757 |
| 6,294,061 B1 * | 9/2001 | Morkovsky et al. ........ 204/242 |

* cited by examiner

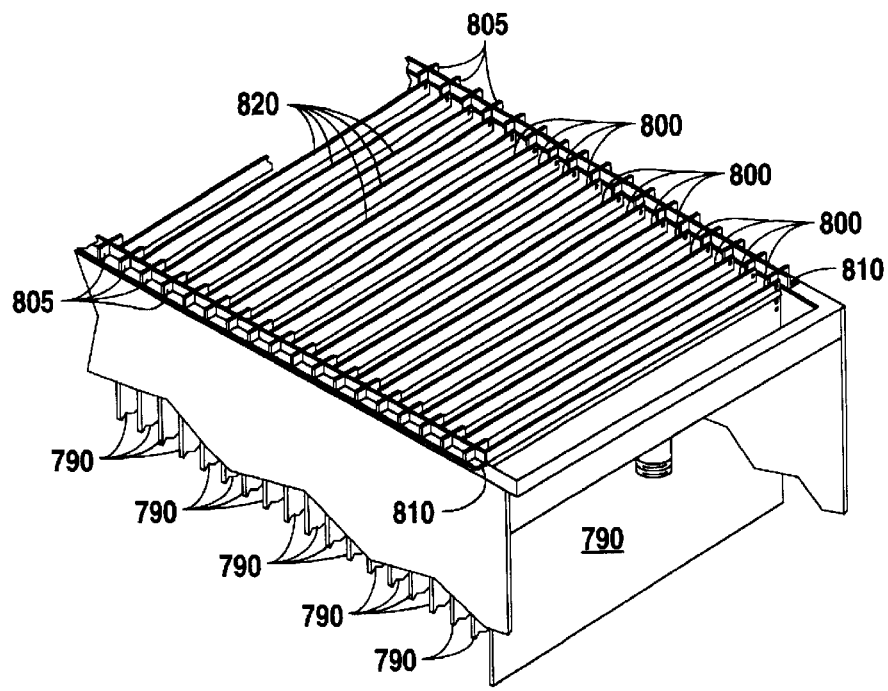
Fig. 8a
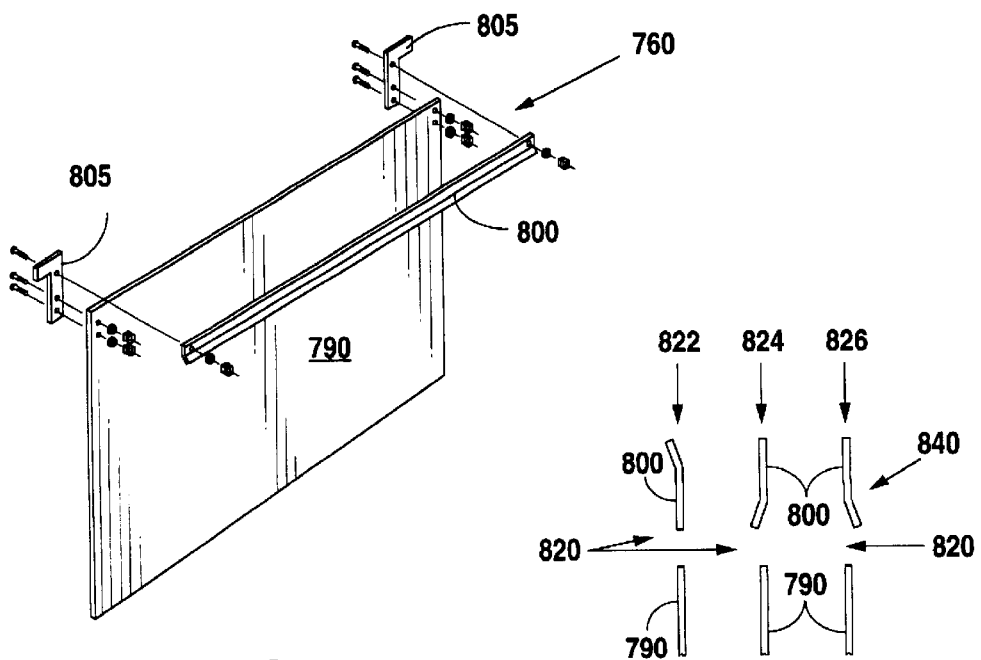
Fig. 8b
Fig. 8c

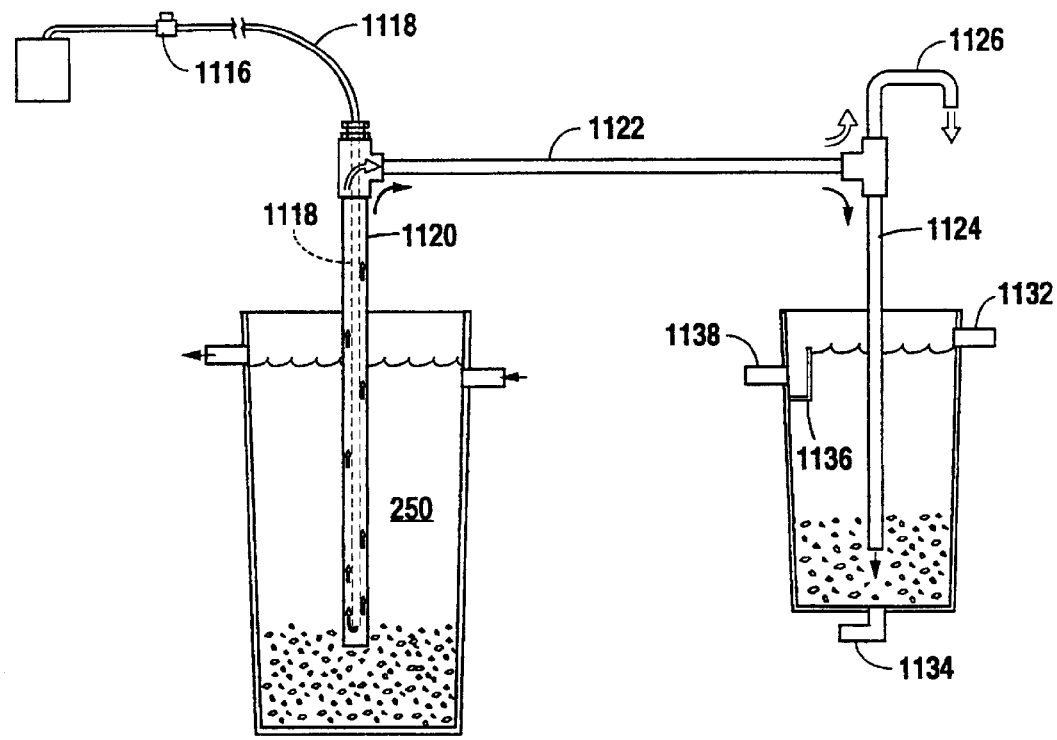
Fig. 17
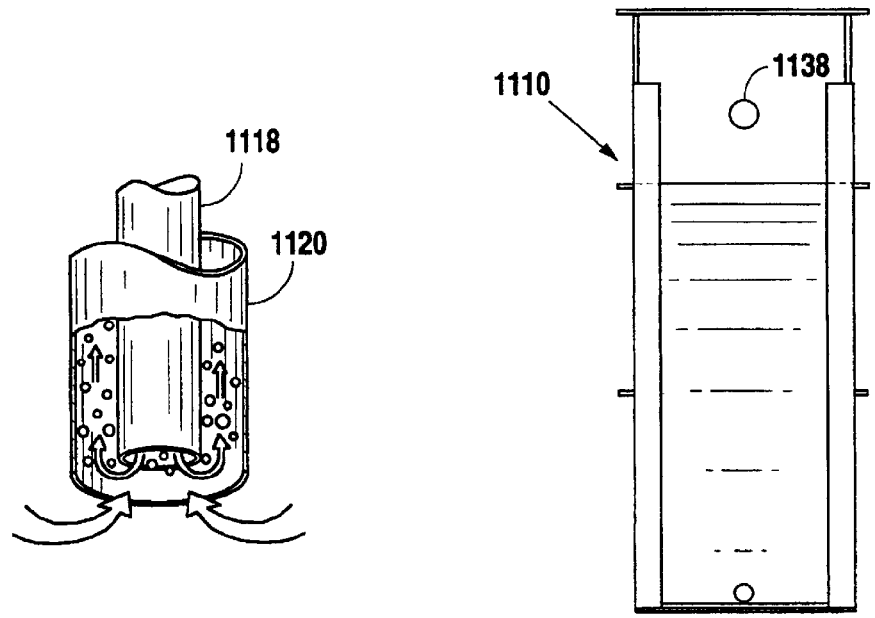
Fig. 17A
Fig. 18C

PROCESS AND APPARATUS FOR ELECTROCOAGULATIVE TREATMENT OF INDUSTRIAL WASTE WATER

This is a Continuation-in-part of applications Ser. No. 09/554,975 flied on Jul. 17, 2000; U.S. Pat. No. 6,294,061 and Ser. No. PCT/US98/24885 filed on Nov. 23, 1998.

BACKGROUND OF THE INVENTION

1. Field of the Invention

The present invention relates to a process for the treatment of industrial waste water by electrolysis and, more particularly, for cleaning industrial waste water recovered, for example, from industrial boilers, or otherwise containing contaminants, utilizing an electrocoagulative process to chemically bond with a particle to change the particle from in solution to in suspension which can be flocculated and separated from the water. The invention also relates to an apparatus for carrying out the process and especially to an electrolytic cell sludge thickener bubble pump and clarifier used for that purpose.

2. Description of the Related Art

The present invention is directed to improving processes and apparatuses for removing impurities from fluids in a manner which is safe, economical, and user friendly. Attempts by others to provide improvements in the art of water purification are represented by the inventions described below.

U.S. Pat. No. 3,849,281 issued to Bennett, et al. discloses a vertically disposed electrolytic cell used to produce hypochlorite solutions. This unit, while impressing a sinuous path upon the fluid to be treated, requires the use of U-shaped plates as a cathode; current is applied only at the outer extremities of the device. This device is divided up into a series of partitioned cell units; it is not constructed so that the individual cell units may be easily cleaned or repaired.

U.S. Pat. No. 4,124,480 issued to Stevenson is directed to a bipolar cell consisting of stacked electrode plates which impresses a sinuous, or partially-sinuous, path upon the electrolytic fluid traveling through it. A partially sinuous path is described when fluid flow stagnation at the ends of the plates is relieved by pathways existing at the ends of certain plates along the path. This cell is used for the electrolytic generation of chlorine from sea water or other brines. The outer plates are both connected to a positive source so as to act as anodes, and the central plate is connected to a negative source to act as a cathode. This device is used for a different purpose than that of the present invention, and is not constructed so as to be particularly easy to disassemble for repair and replacement of interior parts, since each electrode is held in place with a separate O-ring type seal, which must be carefully removed from the cell assembly during inspection to avoid damage, and if damaged, requires replacement.

U. S. Pat. No. 4,339,324 issued to Haas speaks to a gas generator composed of an electrolytic cell which makes use of a series current path and parallel fluid path. Neither the function, nor the structure of this unit is similar to the present invention.

U.S. Pat. Nos. 4,406,768 and 4,500,403 issued to King, disclose other electrochemical cell assemblies; in these units the electrodes do not span the entire width of the inner chamber. However, these units do make use of a series current and parallel fluid paths.

U.S. Pat. No. 5,549,812 issued to Witt, discloses a method of electrolysis which requires a pulsed current flow and sinuous fluid path. A pulsed current source is used to break down and chemically alter contaminants in order to form a flocculate within the fluid to be treated. After treatment, the flocculate is settled in a tank for removal from the fluid. However, the cell is constructed so as to be particularly difficult to disassemble for inspection and repair. Also, the fluid path moves in different directions across each plate within the cell.

U.S. Pat. No. 3,964,991 issued to Sullins, describes an apparatus for electrolytic flocculation (i.e. electrocoagulation) of suspended colloidal particles. This device is cylindrical in form, makes use of a single, centrally-disposed electrode for operation, and is very difficult to disassemble for cleaning after extended use.

German Patent Document DE 3641365C2 is an apparatus for the cleaning and treatment of contaminated water using "electroflotation," a process where iron and aluminum plates, configured as sets of cascaded electrodes, are consumed by electrolysis as waste water passes over them. This electrolytic process (termed herein as "electrocoagulation") can achieve flotation over a wide pH range without the addition of chemicals, resulting in clarification or cleaning of the water. During electroflotation, metals are oxidized in the waste water to form precipitates, emulsions are broken, and oil components are converted to foam. In practice, fine gas bubbles are produced in the waste water (an electrolyte) by electrolytic action between the electrodes, which form anodes and cathodes. Liberated oxygen serves to oxidize substances in the waste water. The release of metallic ions into the waste water provides flocculating agents which cause contaminants to fall to the bottom while gas bubbles may produce a foam bed at the top. A clean water phase forms between the upper foam bed and the heavier dirty component at the bottom of the fluid bed. In this particular apparatus, both iron and aluminum (which is more expensive than iron) are used as sacrificial electrode materials.

As illustrated by the background art, efforts are continuously being made to develop improved devices for removing impurities from fluids. No prior effort, however, provides the benefits attendant with the present invention. That is, the process and apparatus according to the present invention substantially depart from conventional concepts and designs of the prior art, and in so doing, provide a means of causing particulate impurities within a fluid to cluster together to form larger particles for filtering by subsequent mechanical processes in an economical manner; provides a cell for electrocoagulation which obviates the need for numerous sealing gaskets, is easy to disassemble and clean, employs readily available parts and materials, is easily manufactured, and uses a minimum number of functional components; and includes a clarifier which is more effective than prior art clarifiers. Additionally, prior patents and commercial techniques do not suggest the present inventive combination of component elements arranged and configured as disclosed and claimed herein.

OBJECTS OF THE INVENTION

It is an object of the present invention to provide for an electrocoagulation system to more efficiently remove contaminants from waste water.

It is a further object of the present invention to provide electrocoagulation reactor cell which uses rectangular plates that are easily manufactured and which plates are easy to remove.

It is a further object of the present invention to provide electrocoagulation cell which has plates that are easy to manufacture, maintain, and remove, which also allows for the series flow of waste water therethrough.

It is a further object of the present invention to provide for electrocoagulation cell which contains multiple electrolytic cells therein such that the reactor can operate even if one cell is not functioning.

It is a further object of the present invention to provide for a vessel upstream of a clarifier that will allow sludge to settle out and thicken, which sludge will be removed from the bottom therefrom to oppress.

It is a further object of the present invention to provide for a sludge thickener in fluid communication with the clarifier of the system to cycle sludge from the clarifier back to the sludge thickener to provide more efficient operation.

It is a further object of the present invention to provide for an efficient, inexpensive low cost pump for moving waste water from one vessel to another in the system.

SUMMARY OF THE INVENTION

The present invention relates to a process for the treatment of industrial waste water by utilizing an electrocoagulative process to chemically bond with a molecule/particle in solution to change the molecule/particle from "in solution" to "in suspension" so the molecule can be flocculated and separated from the water as a contaminant, which may include heavy metals, dyes, oils, fats, solvents, salts, etc. The electrocoagulative process for treating industrial waste water comprises the steps of:

(a) passing low-pressure industrial waste water containing contaminants susceptible to flocculation and precipitation upon electrolysis of the waste water between electrodes of an electrocoagulation cell designed for long useful life and easy maintenance;

(b) subjecting waste water within the cell to electrolysis by energizing the electrodes with direct current, thereby breaking down and chemically altering contaminants to change the contaminants from in solution to in suspension in the electrolyzed water to form a sedimentable flocculate therein; and (c) separating the flocculate from the resulting cleaned water, using chemical flocculent additives (if needed) and a mechanical clarifier constructed to operate more effectively with greater ease of maintenance than that required by conventional clarifiers.

The invention also anticipates an apparatus for treating waste water which comprises: a pump for moving waste water through an electrocoagulation reactor cell; the cell itself; a defoam tank to reduce the amount of bubbles present in clarified water; a clarifier having a floc mix chamber, a series of horizontally disposed slotted plates of varying lengths designed to follow a shallow inlet and steep outlet wall path, terminating in an outlet weir; and a recessed plate filter press to consolidate flocculated waste materials for disposal.

The electrocoagulation reactor cell of the present invention has ferrous electrode plates physically disposed so as to be parallel to one another, with a spacing fixed by holding slots which traverse the left and right cell walls. In other designs, the plates would also be aluminum, carbon, or of other materials depending on the waste being treated. The cell plates form a meandering guide path for waste water as it moves from the cell inlet to the cell outlet. All other fluid paths are sealed by mechanical abutting contact with a liquid sealant such as silicone being used between abutting surfaces of the outer walls of the reactor cell. Power to the cell is connected to every eleventh plate, by way of slots and holes cut into the plates with fluid-tight seals around the power links to every eleventh plate. The plates to which voltage is connected may be varied according to the design parameters of the particular system.

The clarifier of the present invention has three major containment areas for waste water which has undergone electrocoagulation: a floc mix chamber, the clarifier main body, and an outlet weir. The floc mix chamber has a baffle at the bottom to remove entrained air (passed on to the top of the clarifier) and ensure more thorough mixing of the liquid which passes through it.

The main body of the clarifier comprises a series of horizontally disposed slotted plates of varying lengths; each plate is of such a length that it follows the shallow inlet and steep outlet paths delineated by the clarifier bottom walls, which lead from the clarifier inlet, and to the clarifier outlet, respectively. The slots in the plates are of variable size, and provide a means of selecting a more or less turbulent flow along the fluid path.

Clarified liquid passes through the slots on to the outlet weir. Solids, which fall to the bottom of the clarifier main body, are drained by the operator and passed on to a filter press, where they are consolidated and taken to an appropriate disposal location.

The more important features of the invention have thus been rather broadly outlined in order that the detailed description that follows may be better understood, and the present contribution to the art better appreciated. There are, of course, additional features of the invention that will be described hereinafter forming the subject matter of the claims appended hereto. It should be appreciated by those skilled in the art that the disclosed specific methods and structures may be readily utilized as a basis for modifying or designing other methods and structures for carrying out the same purposes of the present invention. Such equivalent methods and structures do not depart from the spirit and scope of the invention as set forth in the appended claims.

It is to be understood that the invention is not limited in its application to the details of construction and arrangement of the components set forth in the following descriptive drawings. The invention is capable of other embodiments and of being practiced and carried out in various ways. In this same spirit, the phraseology and terminology employed herein should not be regarded as limiting.

Therefore, it is an object of the present invention to provide a new electrocoagulation process and apparatus which can be realized in a relatively small floor surface area.

It is another object of the present invention to provide a new electrocoagulation process and apparatus which may be easily and efficiently manufactured and marketed, being fabricated from readily available materials.

It is a further object of the present invention to provide a new electrocoagulation process and apparatus which is of a durable and reliable construction.

Yet another object of the present invention is to provide a new electrocoagulation process and apparatus which consumes a relatively small amount of power.

Still yet another object of the present invention is to provide a new electrocoagulation process and apparatus that requires minimal maintenance over its entire useful life.

It is also an object of the present invention to provide a new fluid reactor cell for causing particulate impurities within a fluid to cluster together to form larger particles which may be more easily separated by subsequent conventional mechanical processes.

It is another object of the present invention to provide a new fluid reactor cell which may be easily and efficiently manufactured and marketed, being made from readily available materials.

It is a further object of the present invention to provide a new fluid reactor cell which is of a durable and reliable construction.

Yet another object of the present invention is to provide a new fluid reactor cell which consumes a relatively small amount of power.

It is another object of the present invention to provide a new fluid reactor cell which operates effectively under relatively low-pressure and low-velocity fluid flow conditions.

Still yet another object of the present invention is to provide a new fluid reactor cell that requires only minimal maintenance over its entire useful life, i.e. the cell operates for a relatively long time before any disassembly and cleaning is necessary.

It is another object of the present invention to provide a new wastewater clarifier which may be easily and efficiently manufactured and marketed, being made from readily available materials.

It is a further object of the present invention to provide a new wastewater clarifier which is of a durable and reliable construction, the plates of the clarifier may be individually removed while the system is running.

Yet another object of the present invention is to provide a new wastewater clarifier which consumes no electrical power.

Still yet another object of the present invention is to provide a new wastewater clarifier that requires only minimal maintenance over its entire useful life.

A still further object of the present invention is to provide a new wastewater clarifier that allows operator selection of turbulence along the fluid flow path from the clarifier inlet to the clarifier outlet.

It is an object of the present invention to provide a new wastewater clarifier having a baffled flocculent mixing chamber which acts to more thoroughly mix partially-cleaned liquid with added flocculent chemicals, while simultaneously removing entrained air from the liquid.

It is another object of the present invention to provide a new wastewater clarifier with a gently-sloped entry fluid path, and a steeply-sloped exit fluid path, each serving to more efficiently separate flocculated materials from the partially-cleaned fluid.

It is a further object of the present invention to provide a new wastewater clarifier which has a multiplicity of operator selectable drain hole locations.

BRIEF DESCRIPTION OF THE DRAWINGS

The above mentioned features and objects of the present invention will become more clearly understood from the following detailed description of the invention read together with the drawings in which:

FIGS. 8a, and 8b and 8c are perspective and side views of the blocking plates within the mechanical clarifier apparatus of the present invention.

FIGS. 17 and 17A illustrate, in elevational view, additional details of applicants flow through sludge thickener.

FIGS. 18A, 18B and 18C illustrate, in elevational view, details of applicants sludge thickener.

DESCRIPTION OF THE PREFERRED EMBODIMENT

Figure 1:
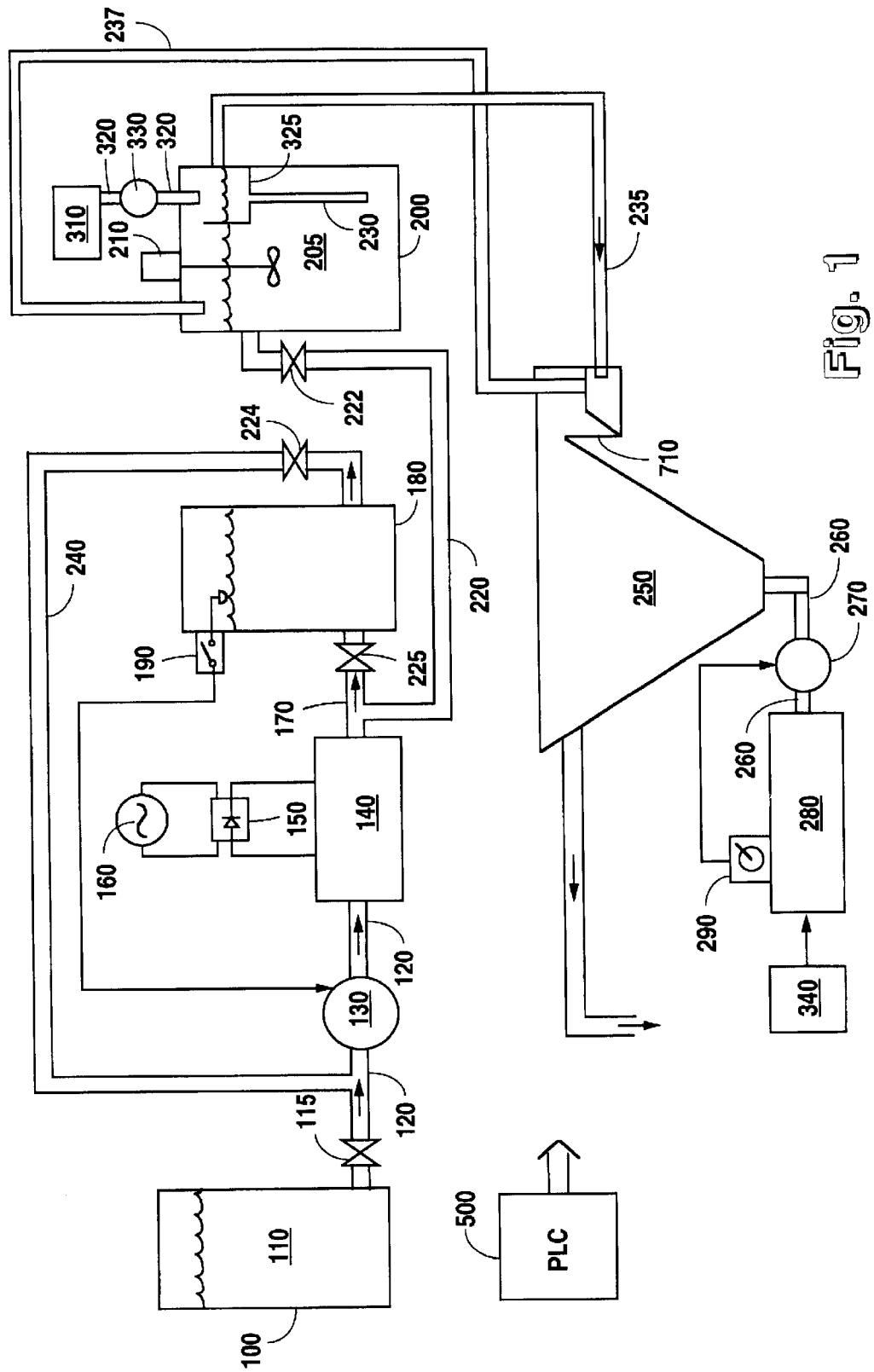
FIG. 1 is a schematic block diagram of the coagulative process of the present invention.

Turning now to FIG. 1, it can be seen that waste water 110 is pumped from a waste holding tank 100 by way of holding tank valve 115 (which must be open), waste water pump 130, and waste pipe 120 into electrocoagulation reactor unit 140. Waste water 110 may also be taken directly out of another process (not shown), as it is produced, instead of from waste holding tank 100. Pump 130, which is typically a diaphragm-type, low-pressure, low volume unit, is configured to operate at a pressure such that a constant volume of waste water 110 per time interval is moved into the inlet of reactor unit 140.

Reactor unit 140 may comprise a single electrocoagulation reactor cell, or as a series of such cells, depending on the amount and composition of particulate waste present in waste water 110. The more waste which is present, the more efficiently multiple cells, operating as a series-connected fluid path, can be employed. Rectifier 150 takes alternating current from an appropriate power source 160, rectifies it, and provides direct current to the electrical input terminals of reactor unit 140. The amount of voltage and current required depends on the volume of waste water to be processed, the type and concentration of contaminants, and the physical size of the reactor unit 140. To provide for uniform wear, the voltage from the rectifier 150 is reversed every twenty to thirty minutes. Typically, for a single 25 gal./min. reactor unit 140, only 150 amperes at 25 volts will be required. This is in contrast to prior art cells, which required approximately 600 amperes for the same voltage and flow rate. Of course, if several electrocoagulation cells are used in a series fluid path, then rectifier 150 could be connected in parallel to the electrical input terminals of each cell, or a separate rectifier could be employed for each. For the remainder of this description, the reactor unit 140 will be described as if it comprises only a single electrocoagulation cell.

Figure 2:
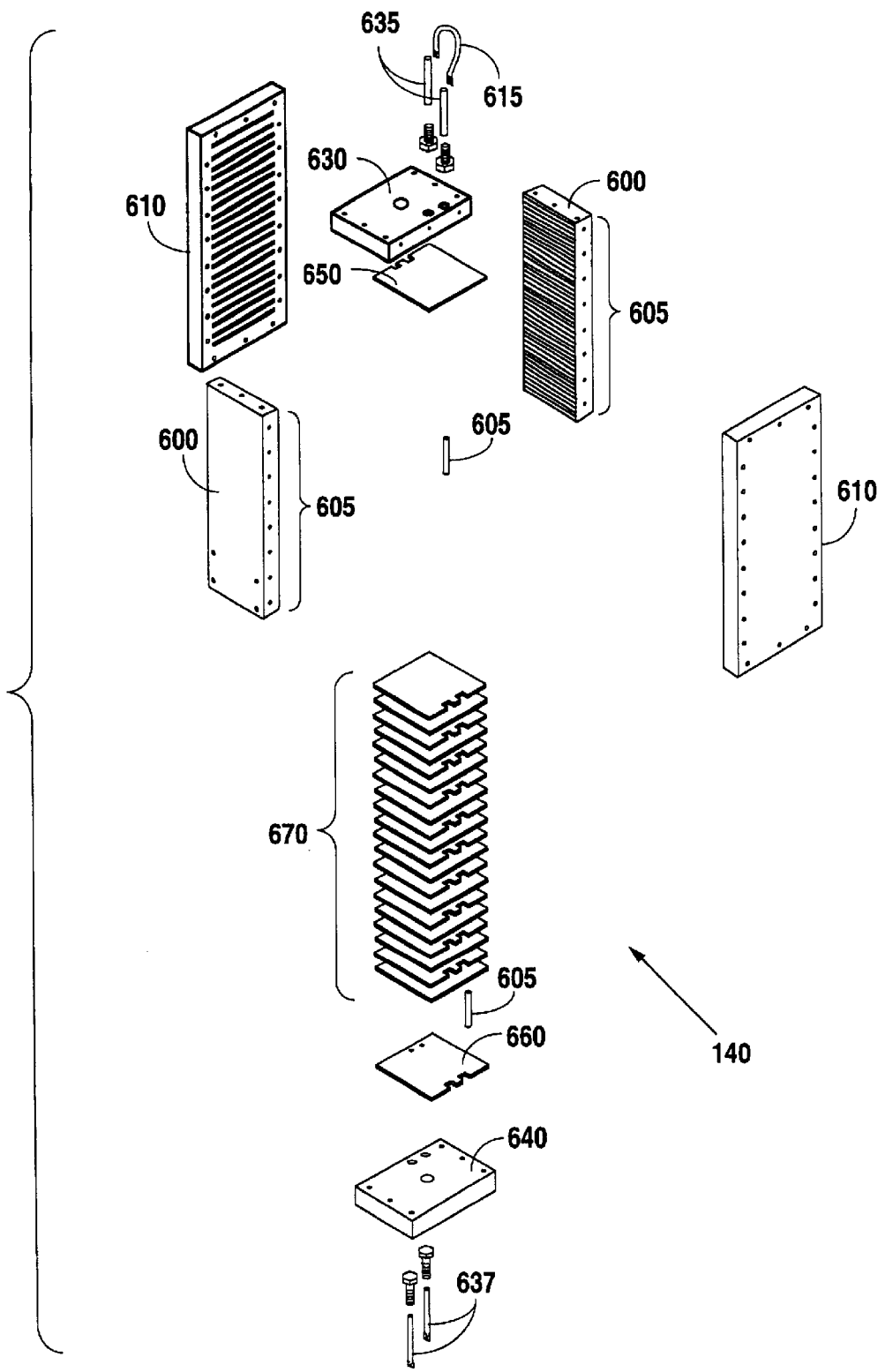
FIG. 2 is a perspective assembly view of the electrocoagulation reactor cell apparatus of the present invention.
Figure 3:
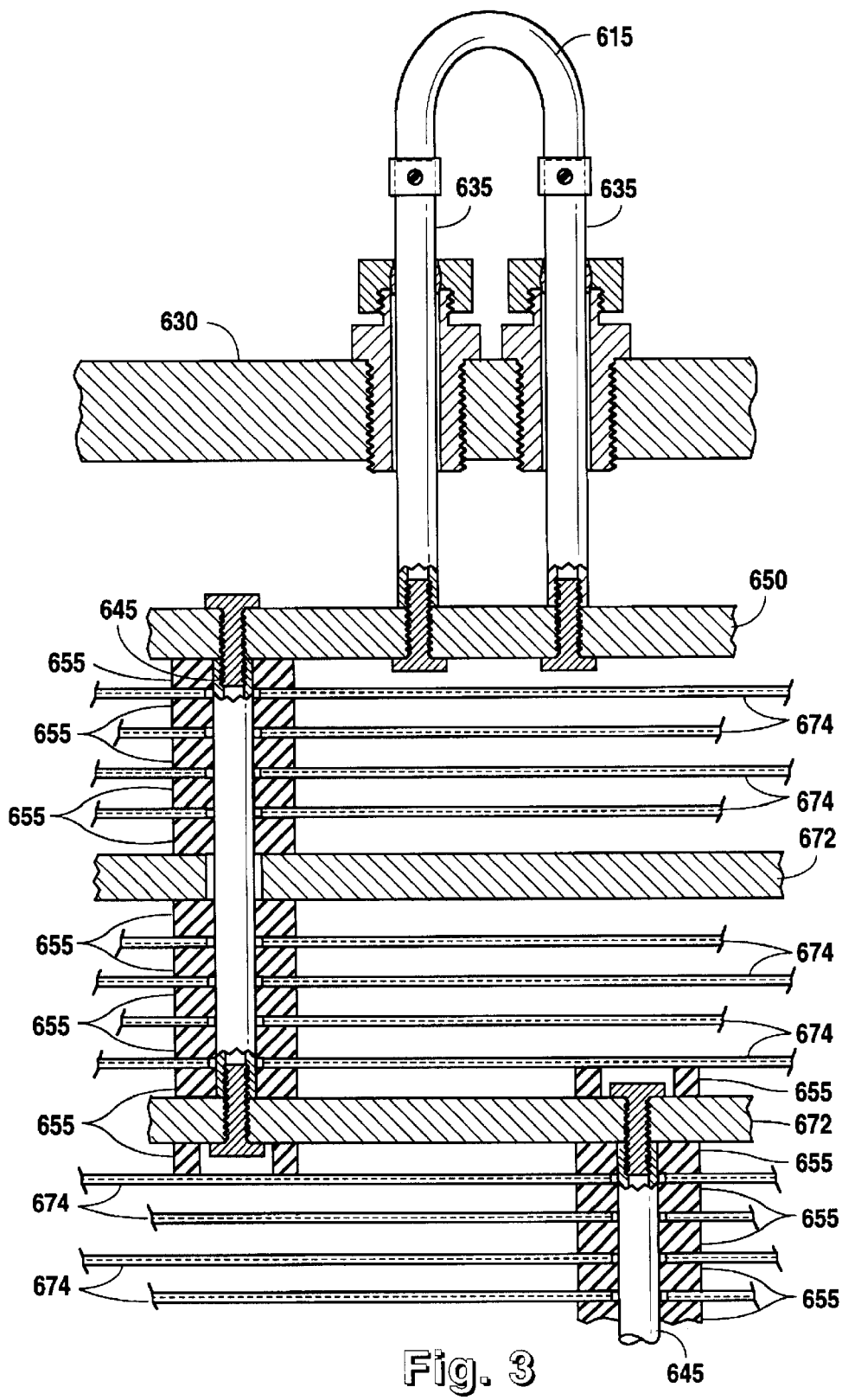
FIG. 3 is a detailed view of the positive electrode connections to the electrocoagulation reactor cell apparatus of the present invention.
Figure 4:
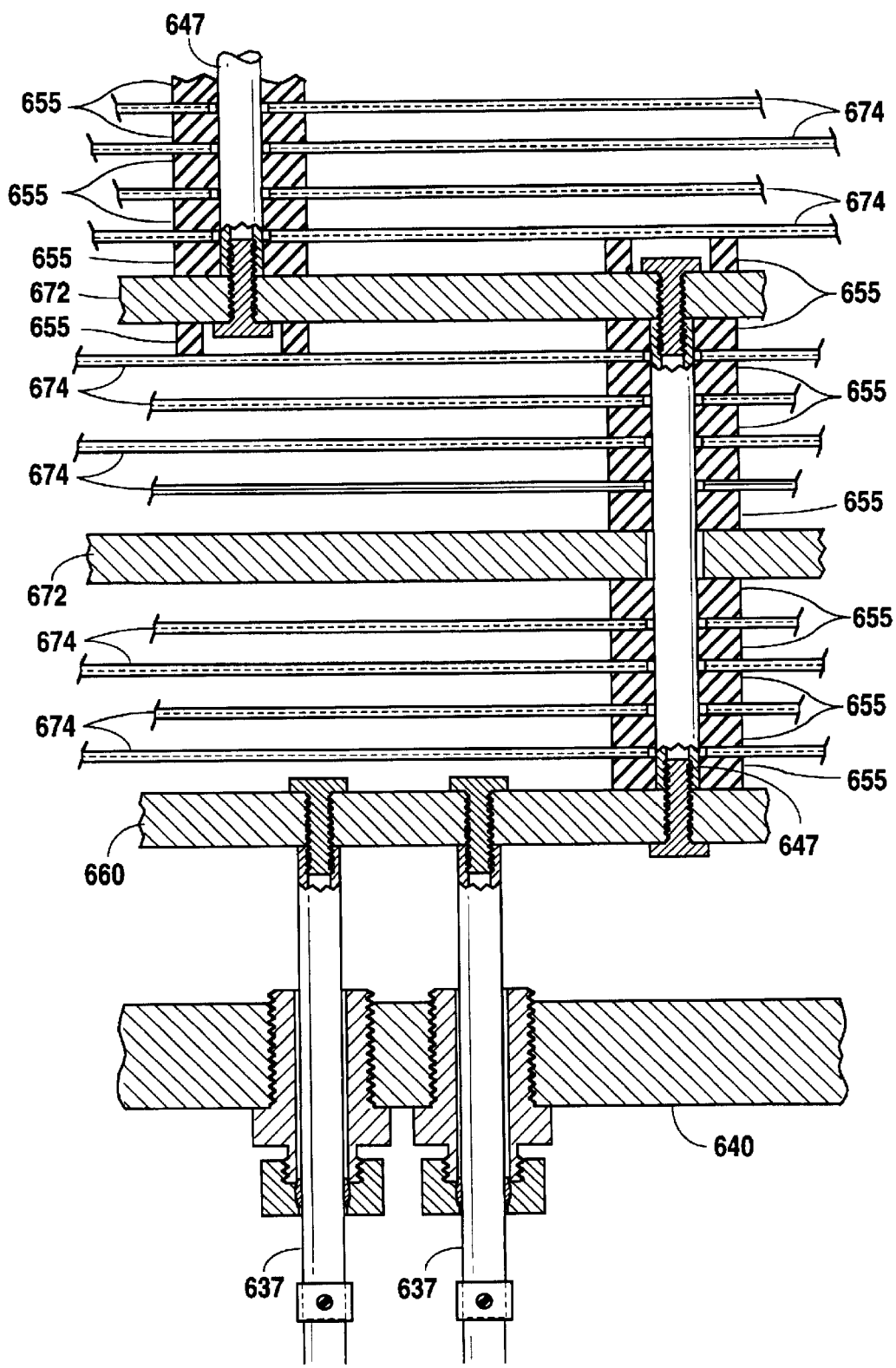
FIG. 4 is a detailed view of the negative electrode connections to the electrocoagulation reactor cell apparatus of the present invention.

Turning now to FIG. 2, it can be seen that reactor unit 140 comprises a number of sacrificial metal plates 670, most commonly made of iron or hot-rolled steel. Copper, carbon, aluminum, metal-impregnated plastics, ceramics, and other materials which may or may not donate ions under the influence of electrolysis can also be used. Plates 670 are typically arranged in a vertically-stacked arrangement, with large surfaces parallel to each other. The plates to which power is connected is a thick plate 672 with the intermediate plates being thin plates 674. In the arrangement as shown in FIGS. 3 and 4, every fifth plate is connected to power and is a thick plate 672. The remaining plates are all thin plates 674. The reason the power plates are thicker is because they combine more with the contaminants in solution and thereby wear faster than the other plates. A void exists between each of the plates 672 and 674. In the 25 gal./min. reactor unit shown, there are preferably a total of 46 plates 670.

Plates 670 can also be arranged so that the large surfaces are non-parallel (i.e. converging, diverging, or in a combination of parallel and non-parallel arrangements). Non-parallel arrangements are believed to provide more complete electrocoagulation of waste components within waste water 110, as a result of increased turbulence and varying electrical fields over the surface of each plate 670. While described, the non-parallel arrangements are not shown in the drawings.

FIGS. 3 and 4 show the positive and negative power input terminal connections to reactor unit 140, respectively. Each connection is symmetrical, with, referring now to FIG. 3, the positive voltage from rectifier 150 being connected directly to positive terminal 615, passed through reactor unit top plate 630 by way of power studs 635, and applied to the first, eleventh, twenty-first, thirty-first and forty-first plates 670 within the body of reactor unit 140, by a series of positive power connector links 645, beginning with top electrode 650 (counted as the first plate 670 from the top of reactor unit 140). This arrangement of connections may be varied according to the results desired. Different voltage gradients can be created by connecting to different plates.

Similarly, as shown in FIG. 4, the negative rectifier 150 voltage is connected directly to negative terminal wires 617, passed through bottom plate 640 and connected to bottom electrode 660 (counted as the first plate 670 from the bottom of the reactor unit 140) by way of negative power studs 637. The negative power supply voltage is then applied to the eleventh, twenty-first, thirty-first and forty-first plates 670 within the body of reactor unit 140, by a series of negative power connector links 647, beginning with bottom electrode 660. Assuming a parallel arrangement of plates 670, the voltage provided by rectifier 150 will be equally divided between plates of opposite polarity. The voltage between plates can be changed by changing the number of plates between power connections.

Figure 5:
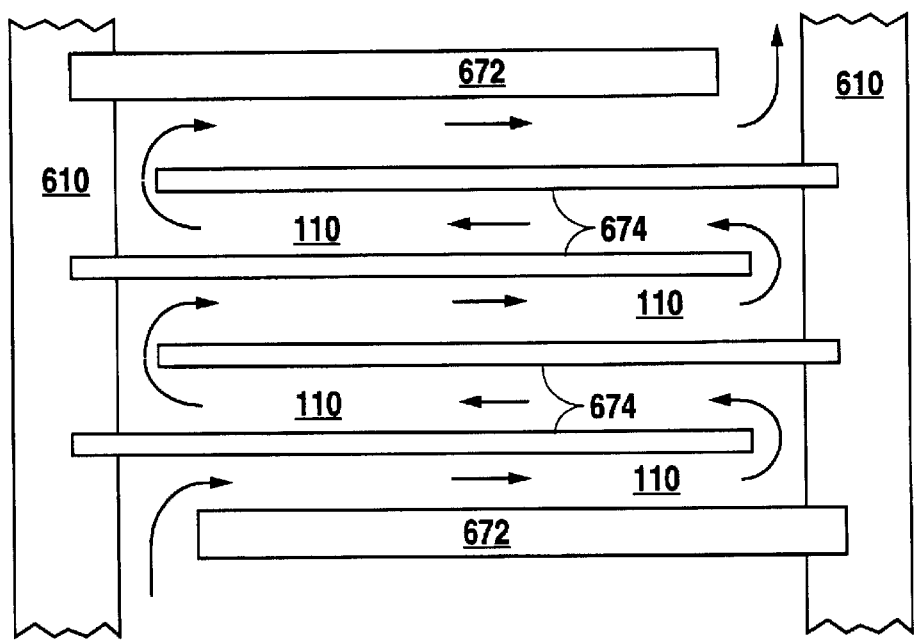
FIG. 5 is a cross-sectional view of the fluid flow path through the electrode plates of the electrocoagulation reactor cell apparatus of the present invention.

Waste water 110 passes in a serpentine route through the voids between the plates as a thin film, as illustrated in FIG. 5. Seals 655, preferably made of latex tubing or an equivalent material, ensure that a fluid-tight seal exists between plates 670. Not all plates 670 need be connected directly to the power supply; in fact, only 10 thick plates 672 out of a total of 46 plates 670 are so connected. Each plate 670 in this arrangement is thus more positive or more negative than its neighboring plate 670, resulting in a differential voltage between adjacent plates, impressing a voltage and current on the space between the plates via conduction by waste water 110. Rectifier 150 reverses the polarity to the plates at selectable intervals, preferably twenty to thirty minutes, to ensure a uniform rate of plate erosion and to clear the plates of unwanted gasses and other deposits. Plates 672, connected directly to rectifier 150 by way of power studs 635 and 637, and power links 645 and 647 are approximately ⅜" thick, as opposed to plates 674, which are only about ¼" thick, and not connected directly to rectifier 150. Directly connected thick plates 672 erode much more quickly than thin plates 674; the variation in thickness provides more even "wear" throughout the reactor unit 140, and a longer operational lifetime.

Referring to FIG. 2, reactor unit 140 with open side plates 600, closed side plates 610, top plate 630, and bottom plate 640 is fabricated from approximately 2.0" thick poly-vinyl chloride (PVC) material. Other non-conducting materials with the required rigidity, pressure-resistant liquid sealing ability, and non-corrosive when exposed to the fluid to be cleaned, can also be used. Reactor unit 140 is constructed to prevent waste water 110 leakage between the plates 670 at open side plates 600 by direct abutting contact with plates 670 as they fit into slots 605. Reactor unit 140 is constructed to preclude similar leakage at each of closed side plates 610 by means slots similarly disposed at one end of each plate, allowing an open path for fluid at the opposite end of each plate, thus defining the serpentine path. Top plate 630 and bottom plate 640 and closed side plates 610 are simply bolted to open side plates 600. Common sealing material is applied between mating surfaces to render reactor unit 140 water-tight because only low-pressure fluid flow is required for effective operation of reactor unit 140. A common sealer that may be used is a silicone type sealer. Prior art units were operated under the assumption that constant volume, high pressure fluid flow (e.g. 60 psi) was desirable. In actuality, more waste can be removed per unit-time from waste water 110 with low-pressure (e.g. 10–20 psi), low-volume flow. This also allows reactor unit 140 to operate at much lower power levels than prior art reactor cell units, as noted above. The combination of low power operation and low-pressure, low-volume fluid flow also reduces the amount of maintenance required to keep reactor unit 140 operating effectively. Prior art cells with similar volume treatment capability could only operate for approximately 40–60 hours before cleaning was needed. The present invention has operated for more than 400 hours before reduced operational efficiency was noted.

Regular maintenance and cleaning of reactor unit 140 is greatly simplified by the above-mentioned construction. The operator need only unbolt closed side plates 610 from open side plates 600 to directly access all sacrificial electrode plates 670. Instead of O-rings, a thin layer of adhesive gasket material, preferably RTV® may be applied, making re-assembly of reactor unit 140 a matter of spreading RTV® onto the edges of closed side plates 610 and bolting them back on to the open side plates 600.

Waste water 110, after reaction within reactor unit 140, is discharged into the first process vessel 180 by way of discharge pipe 170. (See FIG. 1) If a batch of waste water 110 versus a continuous flow is being treated, float switch 190, which monitors the fluid level in the first process vessel 180, stops the pump 130 when the first process vessel 180 is full. The operator may then select the final destination of the partially treated water by manually changing valve settings (i.e. open or closed) for holding tank valve 115, defoam valve 222, and recirculate valve 224 and batch valve 225.

Waste water 110 which is sufficiently treated after passing through reactor unit 140 will be discharged as treated water 205 directly to defoam tank 200 by way of treated waste pipe 220 and open defoam valve 222 (recirculate valve 224 and batch valve 225 must be closed). Waste water 110 which requires further electrocoagulation treatment is recirculated from the first process vessel 180, by way of opening recirculate valve 224 and batch valve 225, recirculation piping 240, and pump 130, to reactor unit 140. In this case, holding tank valve 115 and defoam valve 222 will be closed. To provide additional treatment capacity, a multiplicity of holding tanks 180 can be used for temporary storage of waste water 110 as it is treated and circulated through reactor unit 140. That is, additional piping and valves can be provided to allow continuous circulation between the reactor unit 140 and the first process vessel 180, or to a second process vessel (not shown) for batch recirculation between the first process vessel 180 and the second process vessel. Treatment continues in this fashion via tank/valve/pipe selection until the waste water 110 is fully treated, at which time the treated water 205 will be sent to the defoam tank 200.

Agitator 210 in the defoam tank 200 stirs treated water 205. Gasses trapped in treated water 205 are thereby expelled, allowing the de-gassed waters to settle toward the bottom of defoam tank 200, where they exit the tank by traveling up overflow pipe 230 from near the bottom of defoam tank 200 and into attached defoam over-flow weir 325.

A small amount of chemical flocculent may be added via floc tank 310, floc pipe 320 and floc pump 330 to the treated water 205 before it exits the defoam overflow weir 325 and passes on to the clarifier 250. The flocculent, which is preferably an anionic polymer, or similar commonly available formulation well known in the art, collects additional particles and metal ions in the treated water 205 as the water moves downward from the defoam overflow weir 325, then horizontally through defoam pipe 235 to the floc mix chamber 710 of the clarifier 250. Of course, the addition of chemical flocculent is an aid to more rapid coagulation of waste, and is not necessarily required to effect the process of the present invention. Those experienced in the art of waste removal from fluids by flocculation, especially with regard to heavy metal waste components, can readily determine the need for addition of chemical flocculent to the waste stream, depending on the measured quantity of individual waste components present in the treated water 205 fluid stream. That is, lateral coagulation and flocculation of waste solids will occur, and may be sufficient for treatment purposes, even if chemical flocculent is not added.

Figure 6:
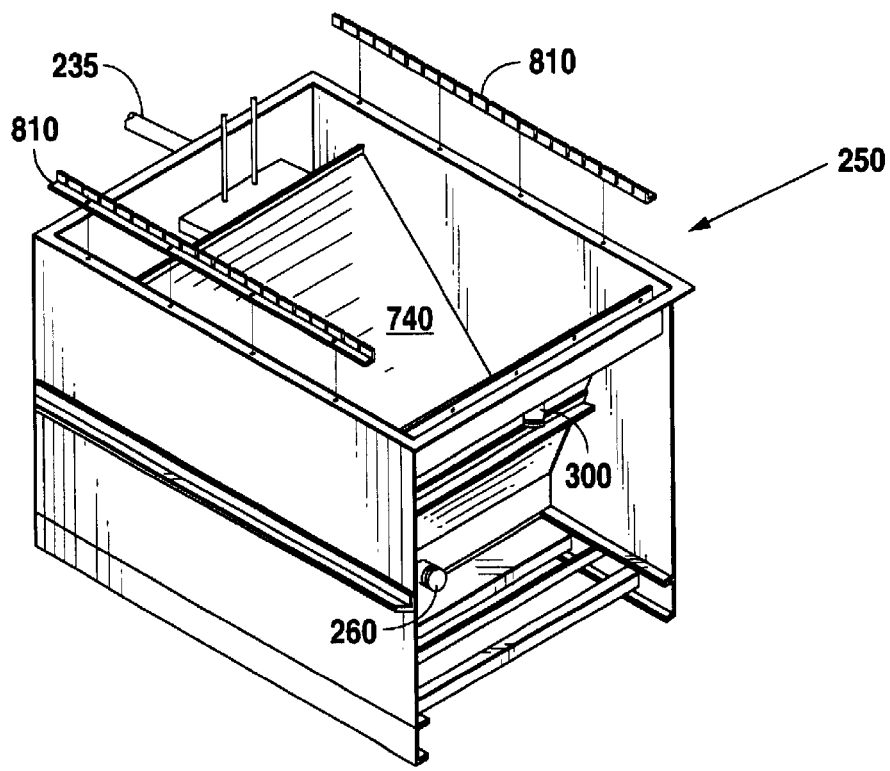
FIG. 6 is a perspective view of the mechanical clarifier apparatus of the present invention.
Figure 7:
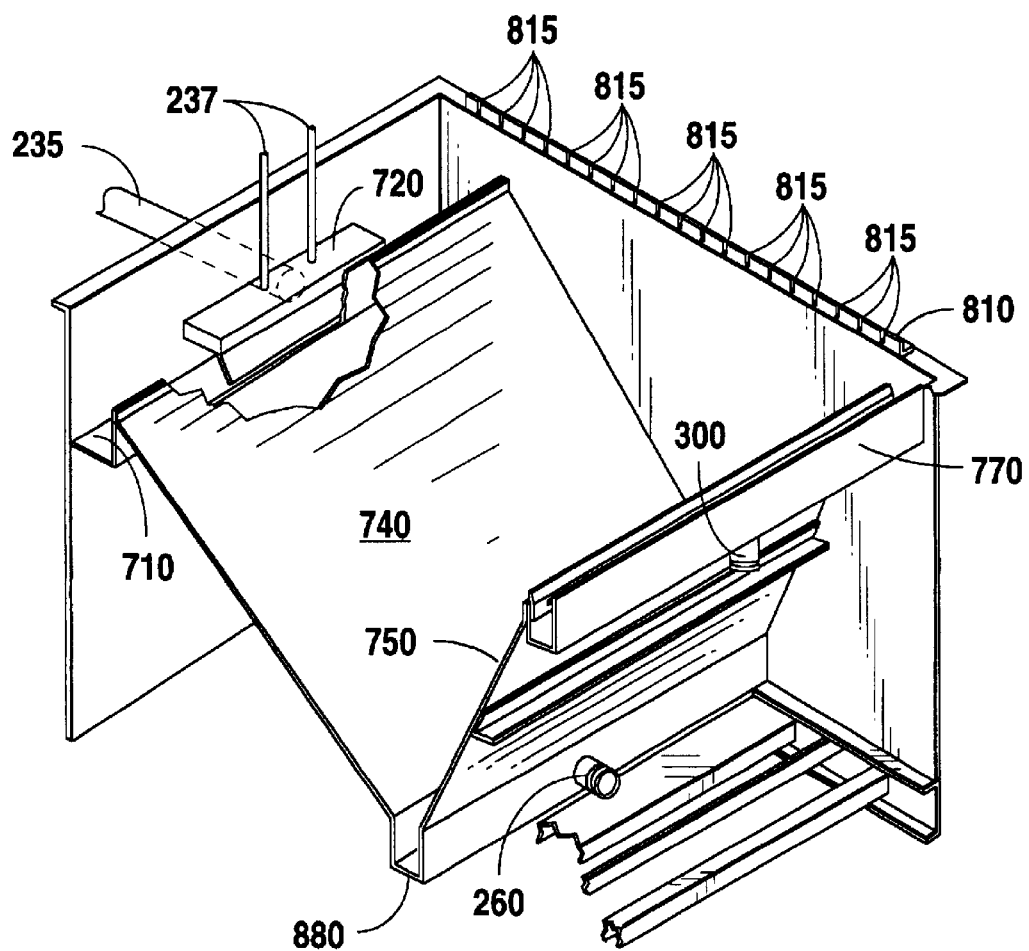
FIG. 7 is a cut-away side view of the inlet and outlet segments of the mechanical clarifier apparatus of the present invention.
Figure 9:
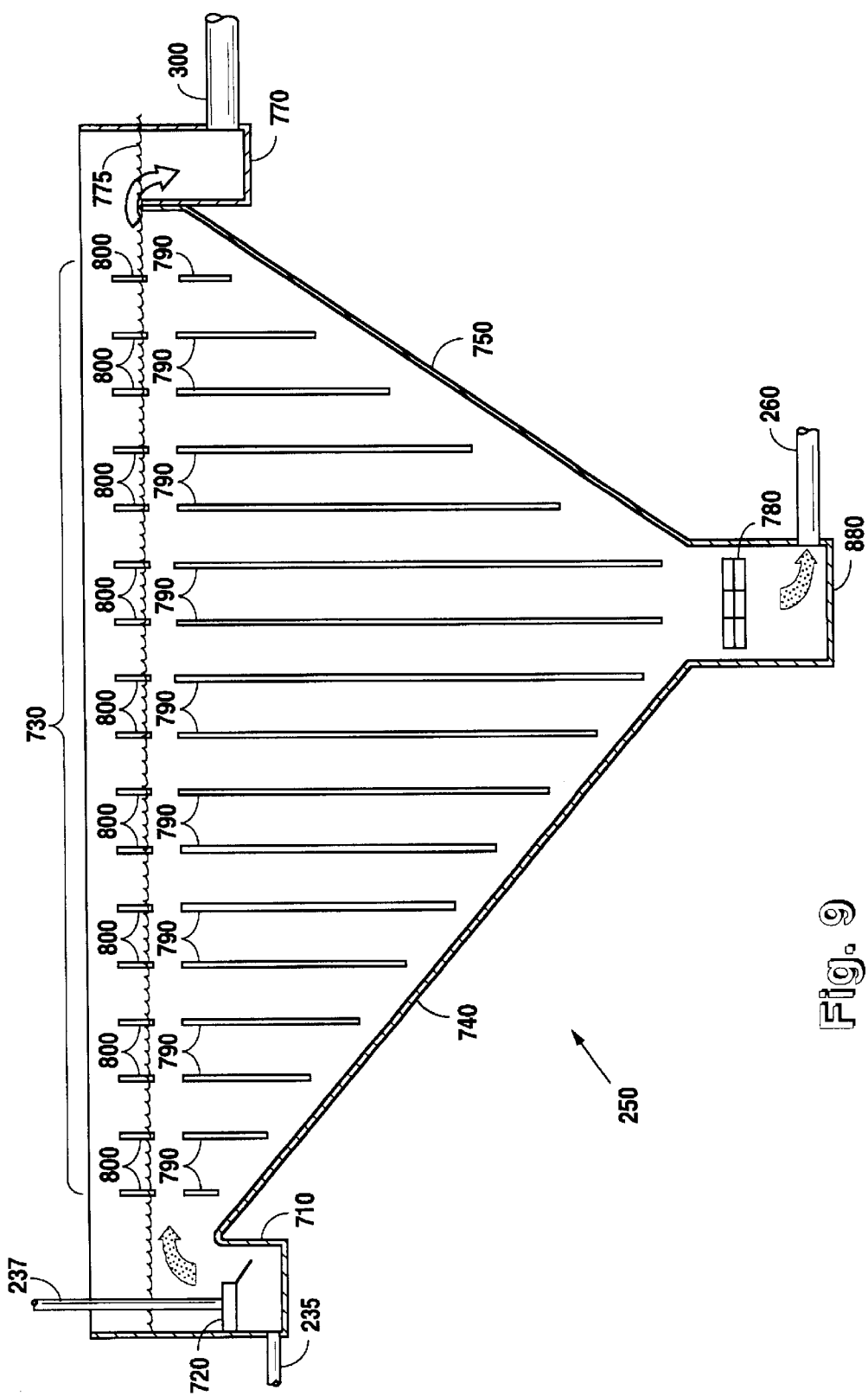
FIG. 9 is a cut-away side view of the blocking plates and notches within the mechanical clarifier apparatus of the present invention.

Turning now to FIGS. 6, 7, and 9, the improved clarifier 250 of the present invention can be seen. The defoam pipe 235 delivers the fluid 110 to the clarifier 250 below a baffle 720. The baffle 720 at the bottom of the floc mix chamber 710 of the clarifier 250 ensures thorough mixing and removes any entrained air from the incoming liquid, passing bubbles, foam, and air to the top of the chamber 710 and back into the defoam tank 200 via bubble pipe 237 (see FIG. 1), without disturbing the slowly moving coagulated materials in the floc mix chamber 710. As liquid fills the floc mix chamber 710 and the coagulated solids attempt to settle, a dense floc bed is formed at the bottom of the floc mix chamber 710, through which all liquid and coagulated waste must pass, ensuring adequate contact between the incoming liquid, flocculent, and coagulated waste, to better remove all available metal particles and ions.

The treated water 205 coming into the floc mix chamber 710 overflows into the main bay 730 of the clarifier. The clarifier main bay 730 has a shallow slope 740 on the inlet end, to minimize turbulence caused by falling coagulated waste, and a steep outlet slope 750 to help ensure that coagulated waste will not approach the clarifier outlet weir 770. The shallow slope 740 would be 45 degrees or less with respect to the horizon and the steep outlet slope 750 will be greater than 55 degrees with respect to the horizon. A number of blocking plates 760, shown in FIGS. 8a and 8b, hang vertically from the top of the clarifier main bay 730, with a predetermined horizontal spacing between them. Plates 760 are of varying lengths, so that the bottom of each plate reaches to within a predetermined distance of clarifier slopes 740 and 750, and the drain 780. Each plate 760 spans the full width of the clarifier, and each plate comprises three major components: the plate wall 790, the slot top 800, and the plate hanger 810. The wall 790 forms the major portion of each plate 760, and is designed to prevent horizontal movement of fluids below the slot top 800, creating a zone of stillness from which coagulated solids may fall as treated water 205 flows from the clarifier floc mix chamber 710 to the clarifier outlet weir 770.

The slot top 800 defines the height of a slot 820 which runs the full width of the clarifier near the top of each plate wall 790. The slot top 800 is designed for use in any of three positions, seen in FIG. 8c, and can be arranged as a vertical barrier, or with leading or trailing angles. The orientation of the slot top 800 is selected based on the characteristics of the solids being separated, and the amount of turbulence desired in the wake of each slot 820, the vertical arrangement 822 giving a median amount of turbulence past the slot 820, the leading arrangement 824 giving more turbulence past the slot 820, and the trailing arrangement 826 giving the least turbulence past the slot 820.

A pair of plate ears 805 tie together one plate wall 790 and its corresponding slot top 800. The connection between the wall 790 and slot top 800 determines the notch 820 height, and the height of the blocking plate 760 assembly above the clarifier slopes 740 and 750, and the drain 780. The ears 805 connect the plate wall 790 to the slot top 800 so that the upper edge of the slot top 800 protrudes above the fluid level 775 of the filled clarifier 250. A series of holding slots 815 in plate hangers 810 mounted on the top of the clarifier main bay 730 receive individual plate ears 805, determine the spacing between blocking plates 760, and hold the blocking plates 760 in vertical alignment.

Exemplary dimensions for a 10 gal./min. clarifier include a clarifier main bay of between approximately 329 and 340 gallon capacity, 19 blocking plates, each with a slot 820 opening measuring approximately ¾ inches high and 44 inches wide. Each blocking plate 760 is spaced approximately 2.9 inches apart from the next blocking plate 760, and the total plate wall area is approximately 119.125 square feet. The floc mix chamber 710 should be able to contain approximately 43 gallons of fluid.

As the coagulated solids and treated water 205 move from the clarifier floc mix chamber 710, across the clarifier main bay 730, and on to the clarifier outlet weir 770, they pass through the individual slots 820 formed in plates 760 by the connection between plate wall 790, plate ears 805, and slot top 800. Heavy materials (i.e. coagulated waste materials)

tend to fall below the slot 820 and continue to the bottom of the clarifier 250, coming to rest at the clarifier drain 780. Floating materials are stopped by the slot top 800 of each succeeding plate along the way from the floc mix chamber 710 to the outlet weir 770. Floating materials are held captive by the their tendency to float in the fluid above the slot 820 until they develop sufficient mass and density to fall into, then below, the level of the slot 820 in the blocking plates 760. Treated water 205 continues to move horizontally until it passes over the outlet weir 770, and on into the drain pipe 300.

Figure 10:
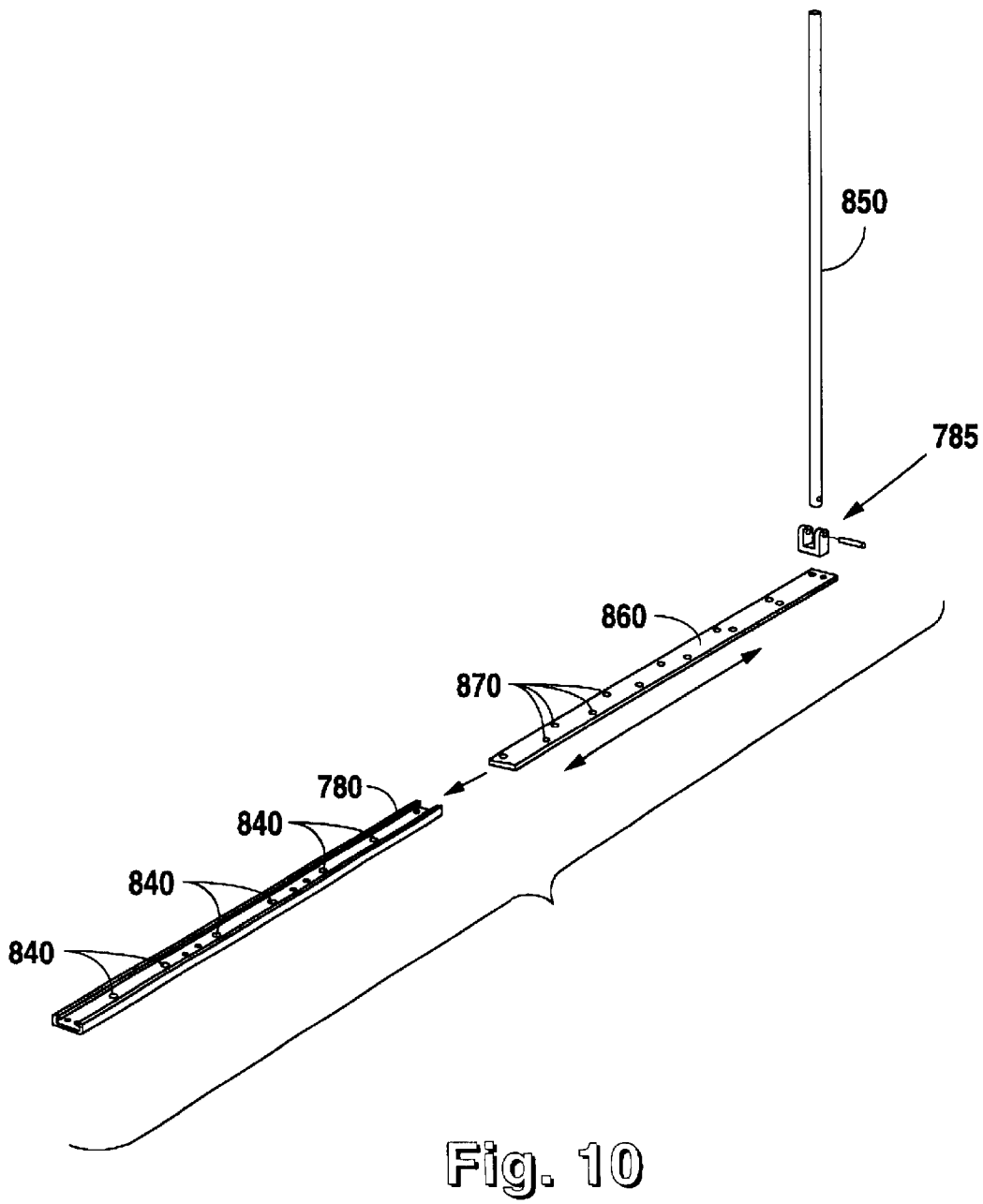
FIG. 10 is a perspective view of the drain mechanism within the mechanical clarifier apparatus of the present invention.

Turning now to FIG. 10, it can be seen that six drain holes 840 are located in drain 780, evenly spaced across the width of the clarifier bottom 880. The seven-position slide valve handle 850 allows the operator to select which of the holes 840 will be used to remove the collected solids by sliding the drain cover 860 across the drain 780 via movement of hinge assembly 785 to expose alternating valve holes 870, allowing falling coagulated waste materials to continue to drop through individually selected drain holes 840 onto the clarifier bottom 880. Six of the valve handle 850 settings will act to open a single drain hole 840, while the seventh setting opens all six holes 840 at the same time.

Coagulated solids which have fallen to the clarifier bottom 880 are then pumped into recessed plate filter press 280 via solids pipe 260 and filter press pump 270 (See FIG. 1). The filter press 280 is operated whenever there are sufficient solids in the press for efficient separation, as determined by the operator, as is well known in the art. The filter press pump 270 fills the chambers of the filter press 280 until the retained solids cause pumping pressure to increase to a predetermined amount, as measured by a pressure gauge 290 for a predetermined period. Typical pressures and time periods for a 2.5 cubic feet capacity press are 40–100 psi and 60 seconds. When these settings are reached, material is no longer pumped from clarifier 250 into filter press 280. Pump 270 is turned off, and air supply 340 is used to introduce air at a predetermined pressure, for a predetermined time period, into filter press 280 so as to force remaining liquid from press 280. Typical values of pressure and time are 40 psi for 30 minutes for a 2.5 cubic feet capacity press, respectively. Once the chambers of press 280 have been filled, and excess liquid removed, press 280 may be opened to eject accumulated solids.

Although the invention has been described with reference to specific embodiments, this description is not meant to be construed in a limited sense. Various modifications of the disclosed embodiments, as well as alternative embodiments of the invention, will become apparent to persons skilled in the art upon the reference to the description of the invention. It is, therefore, contemplated that the appended claims will cover such modifications that fall within the scope of the invention.

FIGS. 11 through 20 illustrate alternate preferred embodiments of Applicants' present invention. The alternate preferred embodiment of the reactor (FIGS. 11 through 15) differs structurally from the embodiments set forth in the preceding figures in, among other things, the location of the power studs, the use of multiple power studs, and the use of single piece "power stud connector links." In the earlier embodiments, it is seen that power studs enter the reactor from the top and bottom to alternately charge the power plates, creating a stack of positive and negatively charged plates (with intermediate plates between them), which will subject the waste water flowing through to an electromagnetic force, resulting in the waste material going from solution into suspension. In the alternate preferred embodiment disclosed, Applicants charge a stack of plates alternately with positive and negative, but charge them through power stud connector links or other power engagement means coming in from one or two of the side walls or coming in from the side walls and the top and bottom walls.

Further it is seen with the earlier embodiments that the plates are charged in series such that a break in any of the charged plates or the power stud connector links connecting the plates would disable the unit. Applicants' current embodiment provides multiple power input points to split up amperage and, if any breakage were to occur within a single power input point, additional cells in the reactor would allow the unit to function.

Among the changes to the early embodiment and illustrated in the alternate preferred embodiment set forth in FIGS. 11 through 15, are that the power stud and connector links may be integrated and the integrated unit recessed into cutouts in the inner surfaces of one or more of the side plates. This places the power connector links outside the perimeter of the non-connected plates, thereby eliminating the need for machining notches or drilling holes in the plates as set forth in the earlier embodiment (see, for example, FIG. 2). This makes it easier to manufacture plates and also to change them out.

With reference to FIGS. 11 through 14, the power stud connector link now passes through the side plates directly to the charged plates. This structure provides multiple power input points to the reactor. The power plates are longer than the intermediate plates so as to be able to enter the cutout portion of side walls. However, the longer power plates still have a small hole drilled in each for attaching to the connector link or power engagement means.

It is noted that the seals and insulators between plates need no longer be present (see, for example, FIG. 3, element 655). Moreover, it should be appreciated that there are a number of benefits to the alternate preferred embodiment of the reactor all as set forth with respect to FIGS. 11 through 15. One benefit is reduced cost of manufacturing the reactor by simplifying manufacturing of the plates. Also, the new embodiment increases the capacity or power input of the reactor by providing multiple power input points and improving reliability as well.

Figure 11:
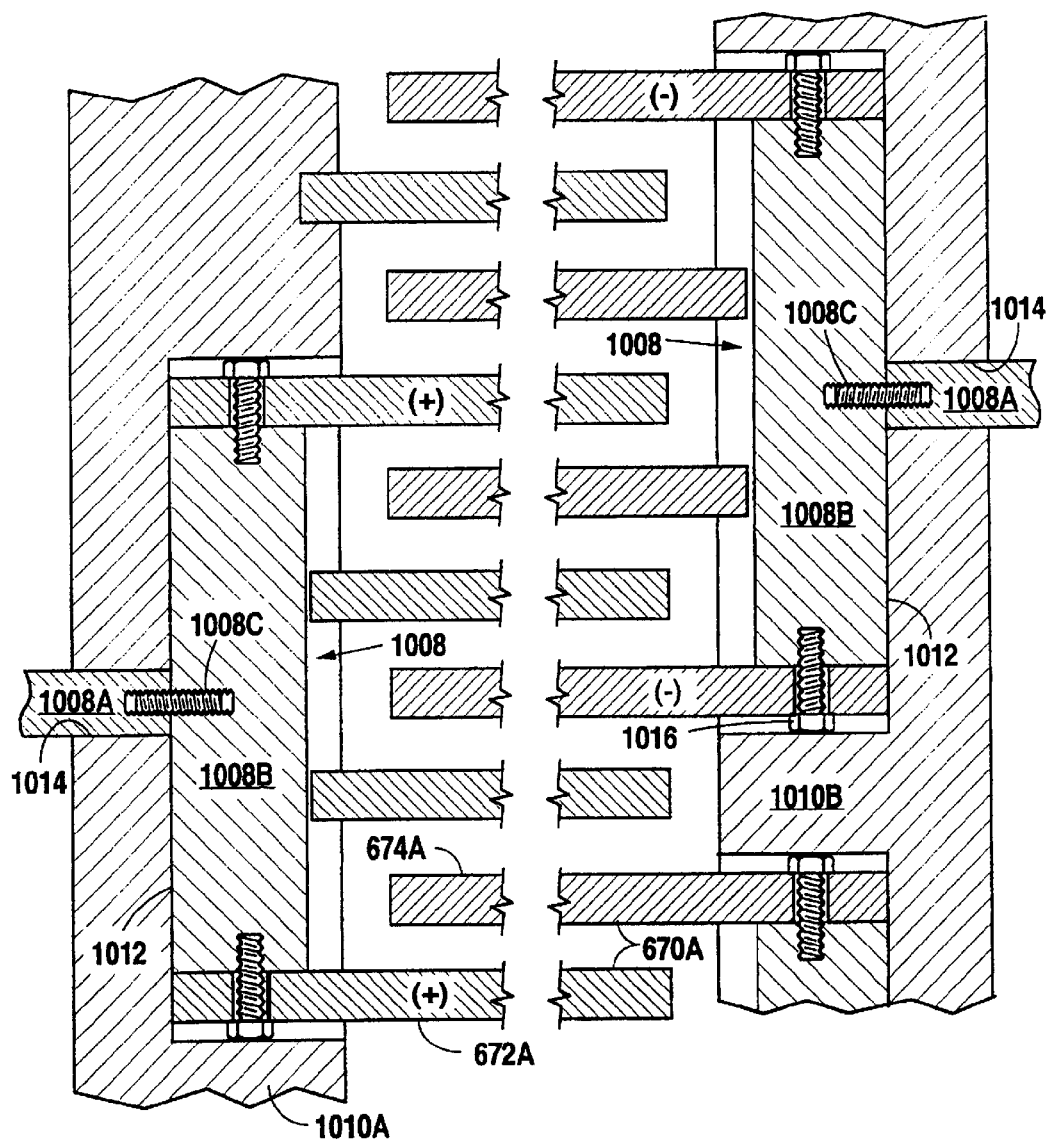
FIG. 11 is a cutaway side view of part of an electrocoagulation reactor unit showing several cells within the unit.

FIG. 11 illustrates an alternate preferred embodiment of Applicants' present invention having features advantageous to the use and maintenance of the reactor, some not illustrated in previous embodiments set forth with respect to FIGS. 1 through 10. This embodiment has side wall mounted power engagement means. Therefore, it is not necessary to machine all the plates with notches or use the insulation means between the plates. In fact, one only need to drill a hole for the fastener in the power plates where the fasteners connect the power plates to the connector links (except as noted below). This is a simpler task than required in the earlier embodiments. Further, reactor assembly and maintenance are easier and the opportunity for reactor fouling is diminished with removal of obstructions from the waste water flow stream. Other advantages will be discernable with reference to the specifications that follow.

FIG. 11 is a cut-away side view of part of an electrocoagulation reactor unit showing several cells within the unit. With specific reference to FIG. 11, it is seen that the reactor unit uses power engagement means 1008 to connect a power source to some of the plates to charge them positively and to other of the plates to charge them negatively. It is seen that the power engagement means illustrated includes a power stud 1008a, comprised of a conductor, which is typically covered by an appropriate insulator and passes through the side wall to engage a connector link 1008*b*, which is also a conductor and is typically set transverse to the power stud. It is noted that the power stud and the connector link are attached to one another through the use of a suitable fastener 1008*c*. On each removed end of each of the two arms of the connector link is located a powered plate 672*a* (either positive or negative) attached to the end of the power link through the use of a power plate fastener 1016.

The reactor unit illustrated in FIG. 1 is comprised of a first pair of opposing side walls 1010, the first pair of opposing side walls having one side wall 1010*a* and a second side wall 1010*b* similarly dimensioned and each having inner surfaces facing one another. It is seen with reference to FIG. 11 that walls on the inner surface of the two opposing side walls include walls 1012 defining a cut-out 1018 (see, also, FIG. 3) for the power stud and walls 1014 defining a cut-out for the insertion of the connector link into the inner surface of the side walls. By providing cut-outs on the inner surfaces of the opposing side walls for receipt of power engagement means 1008 therein, one is allowed to use rectangular plates without notches, cut-outs or holes therethrough as required by plates illustrated in earlier embodiments (see FIGS. 2 and 3). This also allows the use of the plates that are not engaging the connector link to still engage the other parts of the side wall. Indeed, a careful look at FIG. 11 will see how the intermediate (uncharged) plates extend part way into the cut-out, but do not touch the surface of the connector link. The surface of the connector link may be coated with an insulator such that if the inner plates do touch it, they will not receive a charge.

Figure 12:
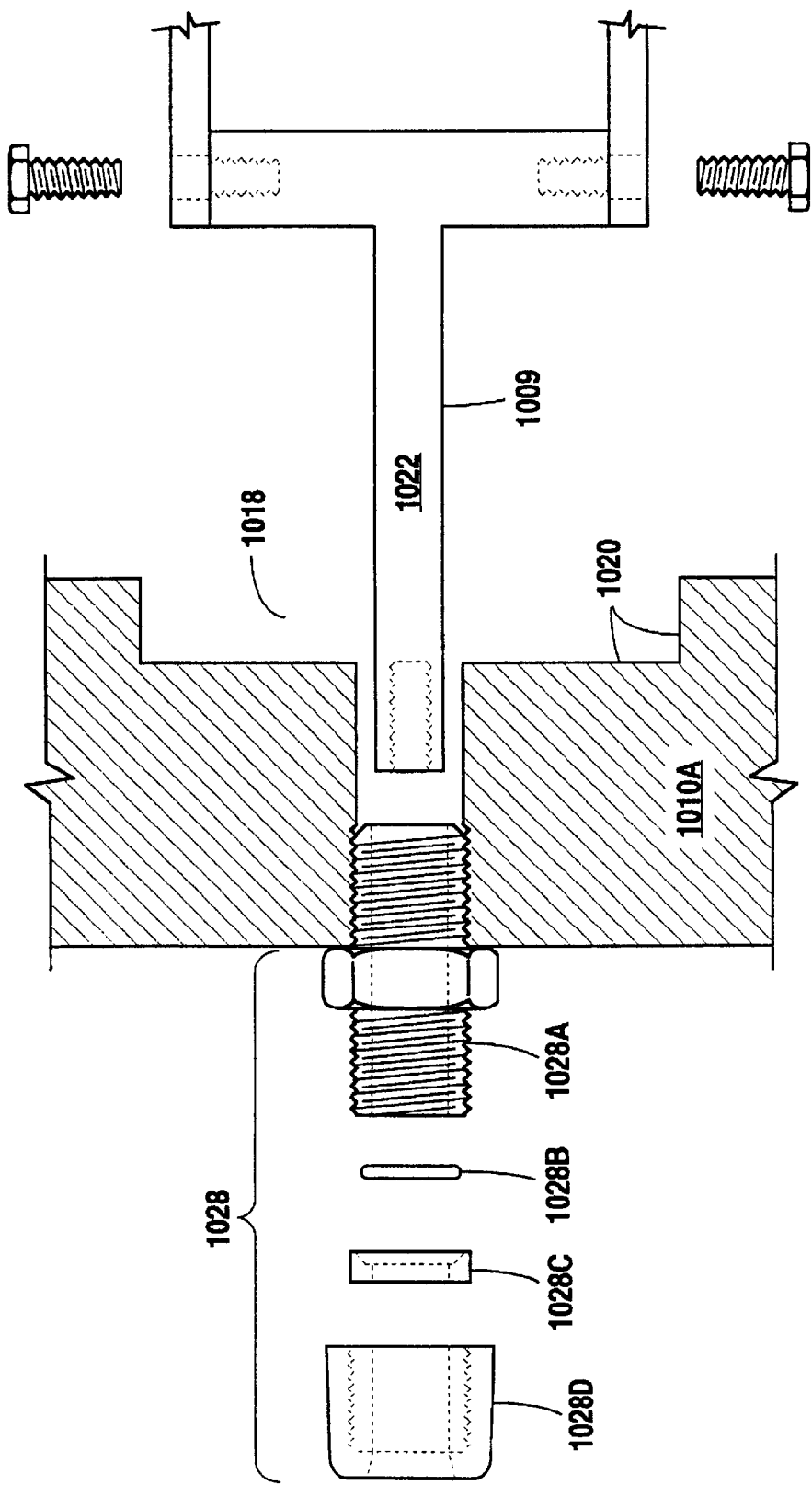
FIG. 12 discloses a partial side view of an alternate preferred embodiment of a power engagement means.

FIG. 12 illustrates a alternate preferred embodiment of power engagement means 1008, which alternate preferred embodiment features a single piece unitized power stud/connector link ("power stud connector link") 1009 which is typically T-shaped and made from Copper with PVC or other insulated coating thereon. The unitized power stud connector link 1009 includes a power stud arm 1022 and a first power plate connecting arm 1024, as well as a second power plate connecting arm 1026, in the T-shaped configuration. FIG. 12 also illustrates the manner in which one or both side walls of the first pair of opposing side walls 1010 include a power engagement means cut-out 1018, as well as walls 1020 defining the power engagement means cut-out to allow insertion into the cut-out of the power engagement means which allows use of unnotched rectangular plates in the reactor unit.

FIG. 12 also illustrates the use of a means for preventing fluid leakage out of the reactor where the power stud arm 1022 passes through the side wall. Specifically, FIG. 12 illustrates the use of compression-fitting 1028 which includes a threaded side wall engagement member 1028*a* to fittably engage side walls which have been threaded for receipt of the compression fitting thereinto. On that portion of the threaded side wall engagement member which extends above the outer surface of the side wall, an o-ring 1028*b* is placed in and a seat 1028*c* is placed above the o-ring. A compression cap 1028*d* fits over the o-ring and seat and threadably engages the exposed portion of the threaded side wall engagement member and is tightened down on the seat and the o-ring which will cause the o-ring to seal against the side walls of the power arm stud 1022 in a fluid-sealing fashion to prevent leakage of fluid from within the cell.

Figure 13:
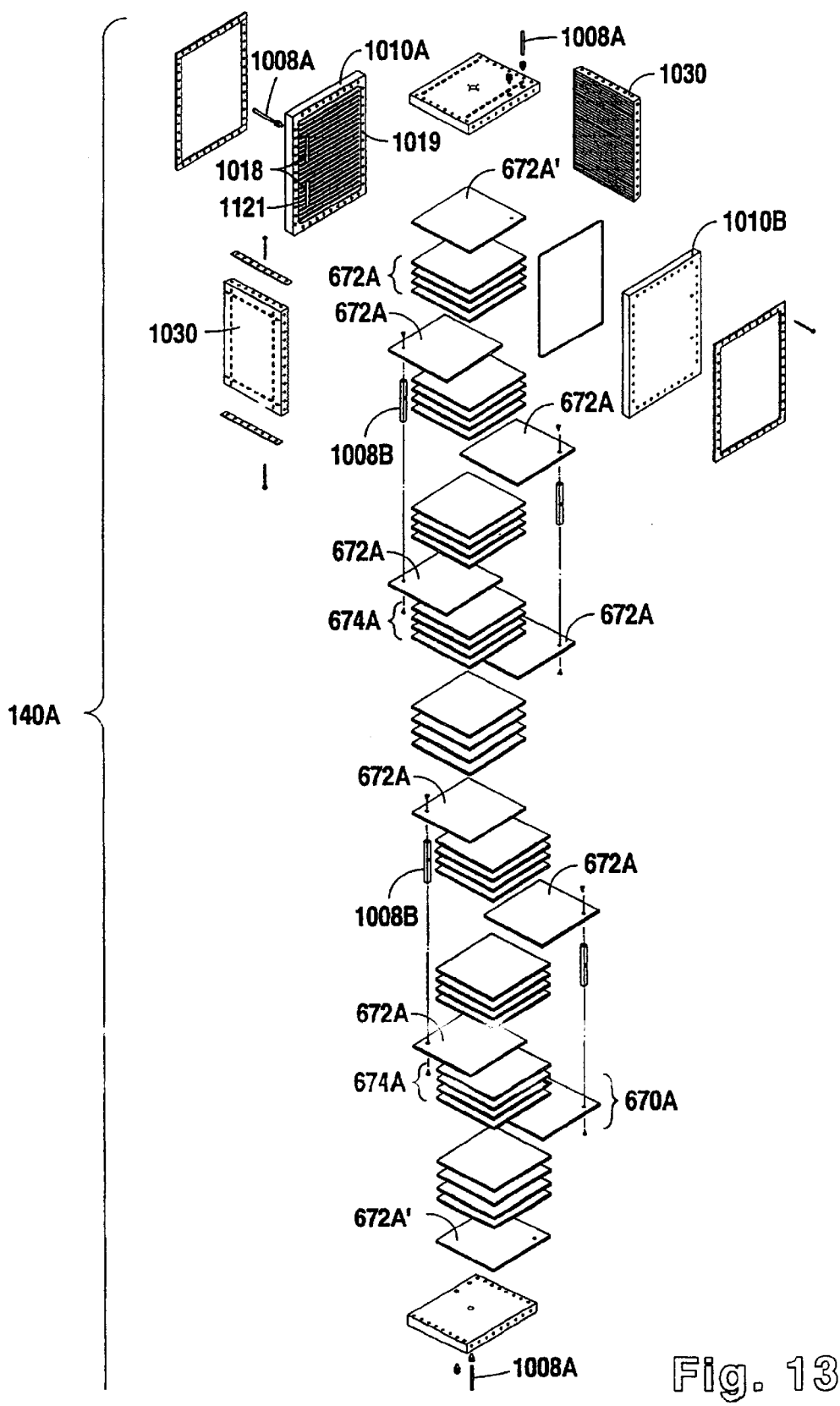
FIG. 13 illustrates an exploded perspective view of an alternate embodiment of a reactor unit.

FIG. 13 illustrates a preferred alternate embodiment of a reactor unit 140*a* in which the plates are easier to machine and easier to remove, but still allows series flow of liquid from one end of the reactor to the other while passing through multiple cells (a cell defined as a positive plate and an adjacent negative plate, including the intermediate uncharged plates therebetween). Element 670*a* in FIG. 13 refers to all of the plates (charged or intermediate) inside the reactor. Some of the plates are charged (power plates) 672*a*. In some alternate preferred embodiments there may be power plates 672*a'* that are adjacent the top or bottom wall of the reactor unit and charged through power studs coming through the top end or bottom wall. Uncharged intermediate plates are designated 674*a*.

FIG. 13 provides an additional view of the power engagement means cut-out 1018 on the inner surface of the walls of the first pair of opposing side walls 1010*a*. It is also seen how the inner surfaces of the opposing side walls have plate engagement grooves 1019 to slotably receive a portion of the edge of plates 670*a*, but as is noted with reference to FIG. 11, power engagement means are deeper than the plate engagement grooves 1018 for the uncharged plates 674*a*, while the grooves for the charged plates have to be deep enough to allow the plate to fasten with a connector link and still maintain a straight edge all the way across the side wall. Moreover, it is seen with reference to FIG. 13, that there are also a second pair of opposing side walls 1030 which also have grooves machined in the inner face thereof to allow plates 760*a* to slide into the reactor.

Illustrated in FIG. 13 is the two piece power engagement means (having a power stud fastened to a transverse connector link) but the single piece power stud connecter link unit may also be used. Further, it is seen that the power stud 1008*a* and connector link 1008*b* fit into power engagement means cut-out 1018, and the entire unit is fastened together with fasteners as set forth in the earlier embodiments. An alternative preferred embodiment for sealing the walls would include an o-ring groove 1121 around the inner perimeter just inside the fastener holes for the placement of a large compressible 112A member to seal with the side walls when pressed together.

Figures 14A, 14B:
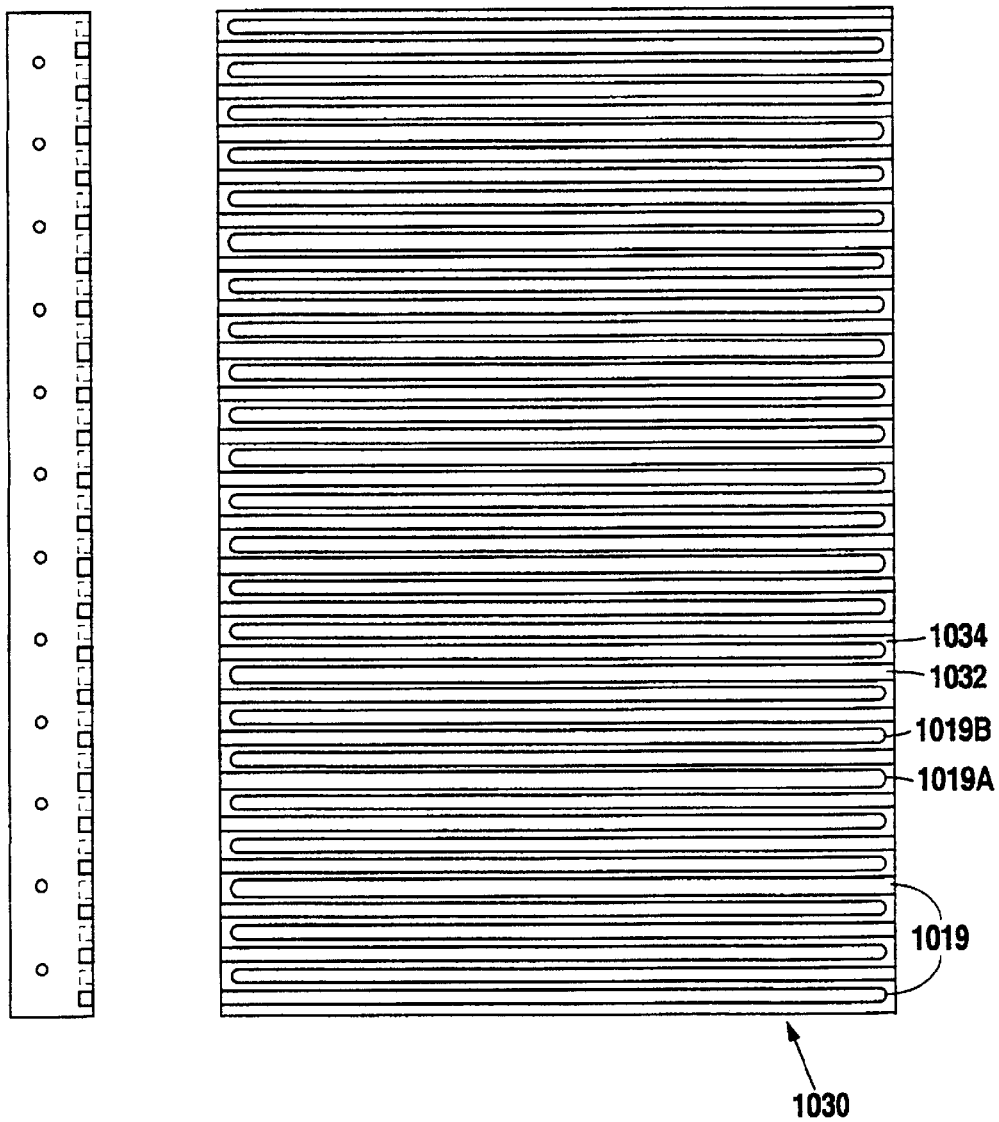
FIGS. 14A and 14B disclose elevational views of the inner surface of one of an opposing pair of sidewalls and a cutaway cross sectional view of the same sidewall.

FIGS. 14*a* and 14*b* disclose an elevational view of the inner surface of one of the second pair of opposing side walls 1030 and a cut-away cross-sectional view of the same side wall which two figures illustrate a series of plate engagement grooves 1019 which are staggered, meaning the grooves alternately have an open end 1032 and a closed end 1034 so they receive the plates and maintain the plates parallel to one another but provide, at closed end 1034, a gap between the end of the plate and the inner surface of the adjacent side wall where fluid can pass, in a serial and serpentine fashion, from one end of the reactor to the other end of the reactor in a fashion so as to pass by each plate. It is seen that some of the plate engagement grooves 1019 are charged plates engagement grooves 1019*a* that may be thicker than adjacent uncharged plate and engagement plate engagement grooves 1019*b*.

Figure 15A:
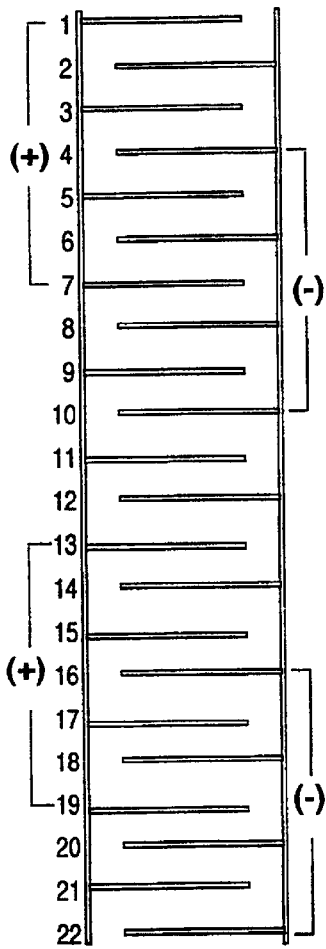
FIGS. 15A, 15B and 15C are schematic illustrations, in elevational view, of alternate preferred embodiments of applicants invention.
Figure 15B:
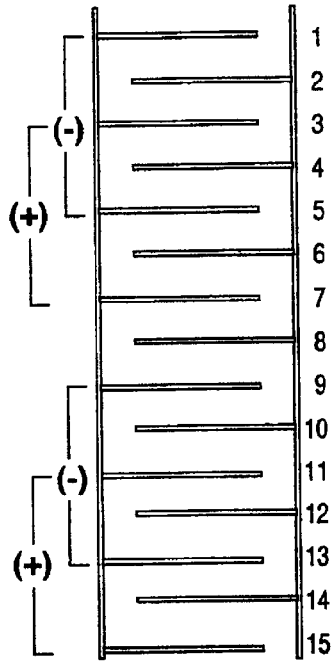
Figure 15C:
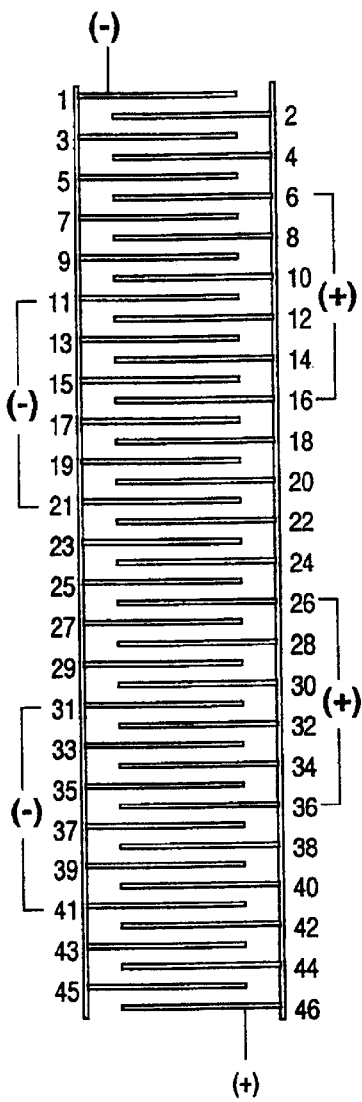

FIGS. 15*a*, 15*b*, and 15*c* are schematic illustrations of various embodiments of Applicants' alternate preferred embodiment. In FIG. 15*a*, multiple power engagement means are used in the opposing side walls, here power engagement means coming off one side wall and off the other to provide a multiplicity of cells within the reactor, each cell having two uncharged plates between appropriately charged plates.

In FIG. 15*b*, multiple power engagement means are coming off the same side wall and are staggered (overlap). This configuration with overlapping power studs on the same side (unlike the others) requires notching of the charged plate where overlapping with the non-engaged power engagement means occurs. This embodiment has multiple cells and multiple power engagement means to provide for multiple charged plates with a single uncharged plate in each cell.

FIG. 15c is a complete schematic illustration of the embodiment of Applicants' reactor as set forth in FIG. 13. Here there are a total of 46 plates with the top plate being negatively charged (through a power stud in the top wall) and a bottom wall being positively charged (through a power stud in the bottom wall). Two power studs come off each opposing side wall to produce a total of nine cells with four uncharged plates between each of the charged plates in a cell.

FIG. 15A or 15B do not necessarily present a complete reactor; they represent a typical partial representation of a reactor that would typically have over 40 plates. Therefore, specific numbers reflected regarding the number of cells, power engagement means, etc. are correct as to the drawings, but do not necessarily reflect the number for a complete reactor. Moreover, FIGS. 15A through 15C are only representative examples of any number of different configurations contemplated by Applicant's present invention. Moreoever, a number of different materials may be used to manufacture the plates.

Figure 16:
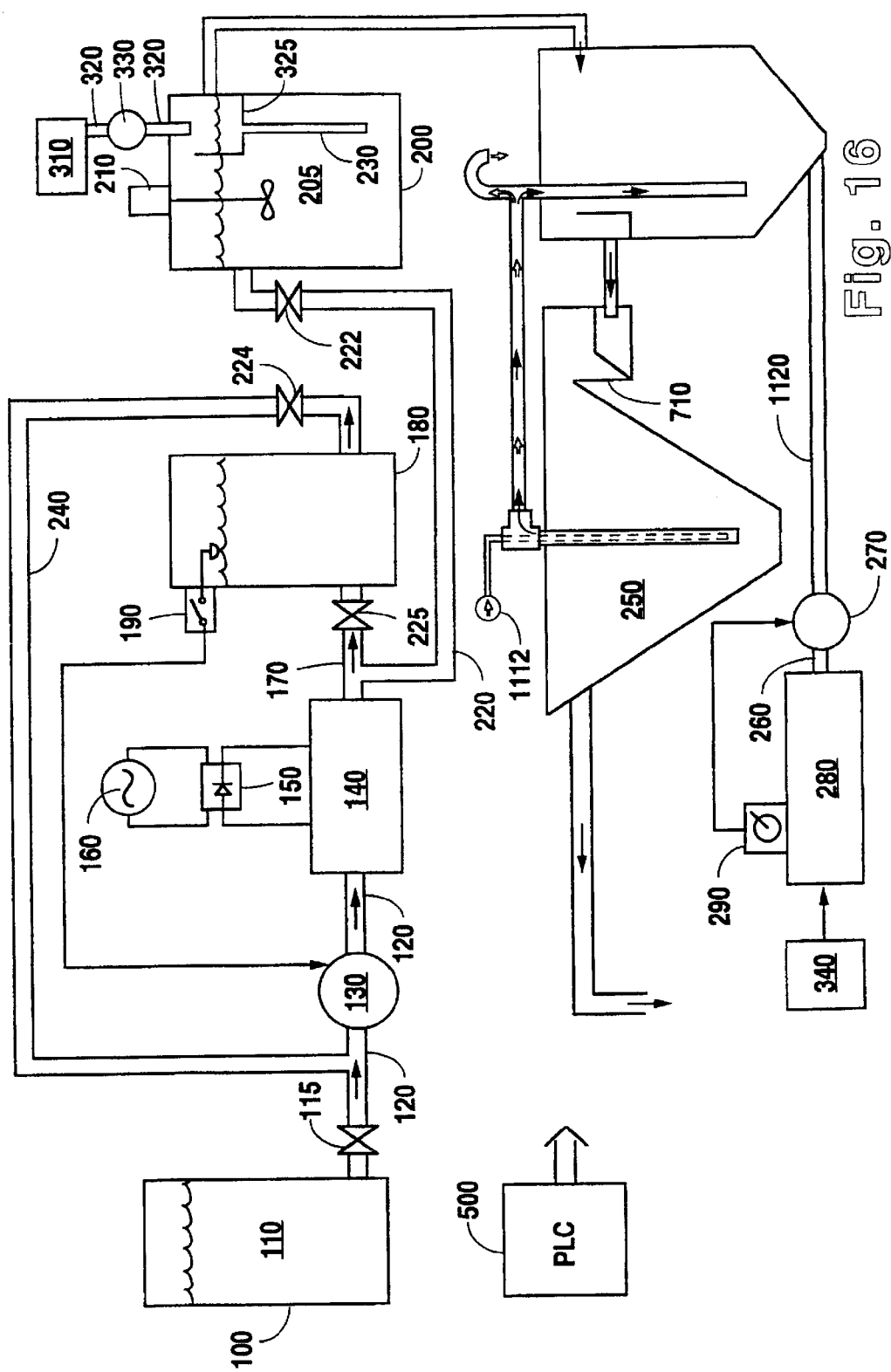
FIG. 16 discloses an equipment drawing showing the elements of an alternate preferred embodiment of applicants present invention.

New FIG. 16 discloses an alternate preferred embodiment of Applicant's present invention which has a number of advantages of the embodiment previously disclosed, and also includes a unique bubble pump for transferring fluids from one vessel of the system to another.

In the embodiment set forth in FIG. 1, it is noted that waste water 110 leaves the foam tank 200 and goes into the clarifier 250. From the bottom of the clarifier, sludge goes into the press water removal. In FIG. 16, Applicant's alternate preferred embodiment directs waste water 110 from the foam tank into a vessel, termed a sludge thickener, which will allow the sludge to thicken and settle to accumulate in the bottom thereof to be drawn, from that vessel into the press, and not from the clarifier into the press.

Moreover, the sludge thickener is upstream of the clarifier, as illustrated in FIG. 16. Water enters sludge thickener 1100 where sludge settles to the bottom thereof for removal through pipe means 1120 to the press. Waste water, with some of the suspended particles removed, exits the sludge thickener near the top thereof to enter the clarifier as illustrated. Sludge will also accumulate near the bottom of the clarifier where it is removed through the use of a unique bubble pump 1112, or a conventional-type pump, back into the sludge thickener 1100.

This system allows the clarifier to maintain a constant level of fluid therein as, when sludge is drawn out of the bottom of the clarifier by the action of pump 1112, it is dumped back into the sludge thickener well below the surface of the fluid of the waste water in the sludge thickener as illustrated in FIG. 16. Another advantage of the flow-through sludge thickener in loop with the clarifier is that there will be less turbulence in the clarifier and is more efficient than use of a clarifier alone, typically allowing excess water from the sludge thickener to go to the sewer rather than, as is normally otherwise required, to run through the whole system again.

FIGS. 17A and 17B illustrate additional features of Applicant's flow-through sludge thickener 1110, bubble pump 1112, and the manner in which it engages the clarifier. More specifically, FIGS. 17A and 17B illustrate the use of bubble pump 1112, which include an air pressure air source, such as, for example, one available from Craftsman catalog number 16212 controlled through a solenoid or other switch means 1116 to feed air through an inner air tube 1118 located within a larger, typically rigid, fluid carrying tube 1119, the larger tube being inserted into or near the bottom of the clarifier with the bottom end open. The inner tube 1118 carries the air from compressor or high pressure source 1114 through larger tube 1118 and will cause bubbling inside the larger tube at the point near the bottom of the sludge chamber. The bubbles will rise inside the larger tube, reducing the weight of the fluid column inside the annulus, causing the fluid to flow up the annulus between tube 1120 and tube 1118 and across cross tube 1120 into the return tube 1124 through or near the bottom of the sludge thickener with air escaping out air vent 1126. Sludge is then drawn off the bottom of the sludge thickener 1110 in the same manner as it is drawn off the bottom of the clarifier as set forth in FIG. 1.

FIG. 17A shows additional details of the bottom end of the bubble pump where bubbles released from the inner air carrying tube rise in the annulus between the inner tube and the outer tube to create a current of water flowing upward. Note that the open end of air tube 1118 terminates above the open ends of the tube 1120. Applicant has found that the bubble pump uses much less energy than conventional pumps, yet is adequate to move sufficient volumes of water between the clarifier and the sludge thickener, and indeed has uses anywhere in the system where any fluid needs to be removed from a vessel.

Figure 18B:
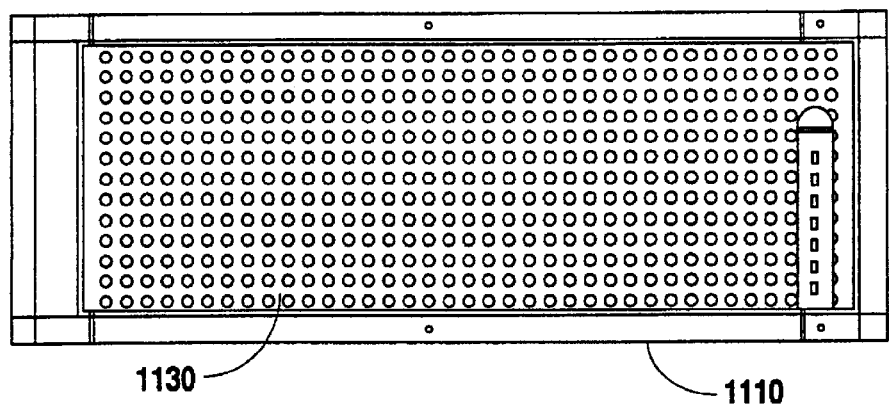
Figure 18A:
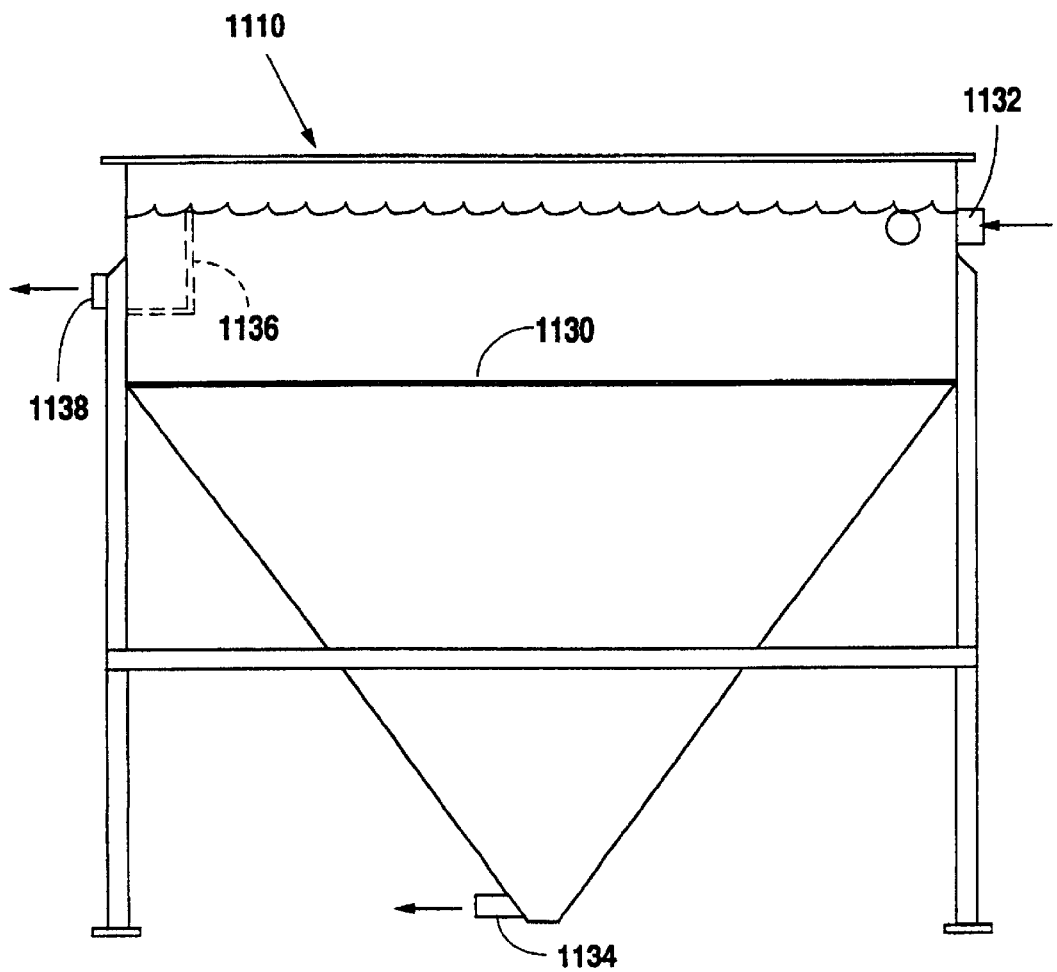

FIGS. 18A through 18C illustrate Applicant's sludge thickener. Applicants' sludge thickener is a vessel for allowing sludge to settle out in the waste water stream between the defoam tank and the clarifier which, when used in conjunction with the return pump, allows sludge to be drawn off the bottom of the sludge thickener rather than the clarifier, promoting efficiency of the clarifier, and allows the fluid in the clarifier to remain a constant level. FIGS. 18A and 18B illustrate the use of sludge thickener 1110 having a unique grate 1130 with numerous holes therein. Water flows into sludge thickener 1110 from the defoam tank at inlet 1132 and sludge settles out through the holes in the grate. The function of grate 1130 is to isolate, or help isolate, the turbulence created by waste water flowing in from the defoam tank, thus creating a "active" zone of turbulence above the grate and a "quiet" zone with less turbulence below the grate to enhance the settling process. Sludge is drawn-off from the bottom of the sludge thickener through outlet 1134 for transport to the press. Weir 1136 adjacent outflow 1136 of the sludge thickener helps ensure that water is drawn off near the top of the sludge thickener which water will typically contain less particles than water below this point. For the sake of clarity, the bubble pump is not shown in these illustrations.

Figure 19A:
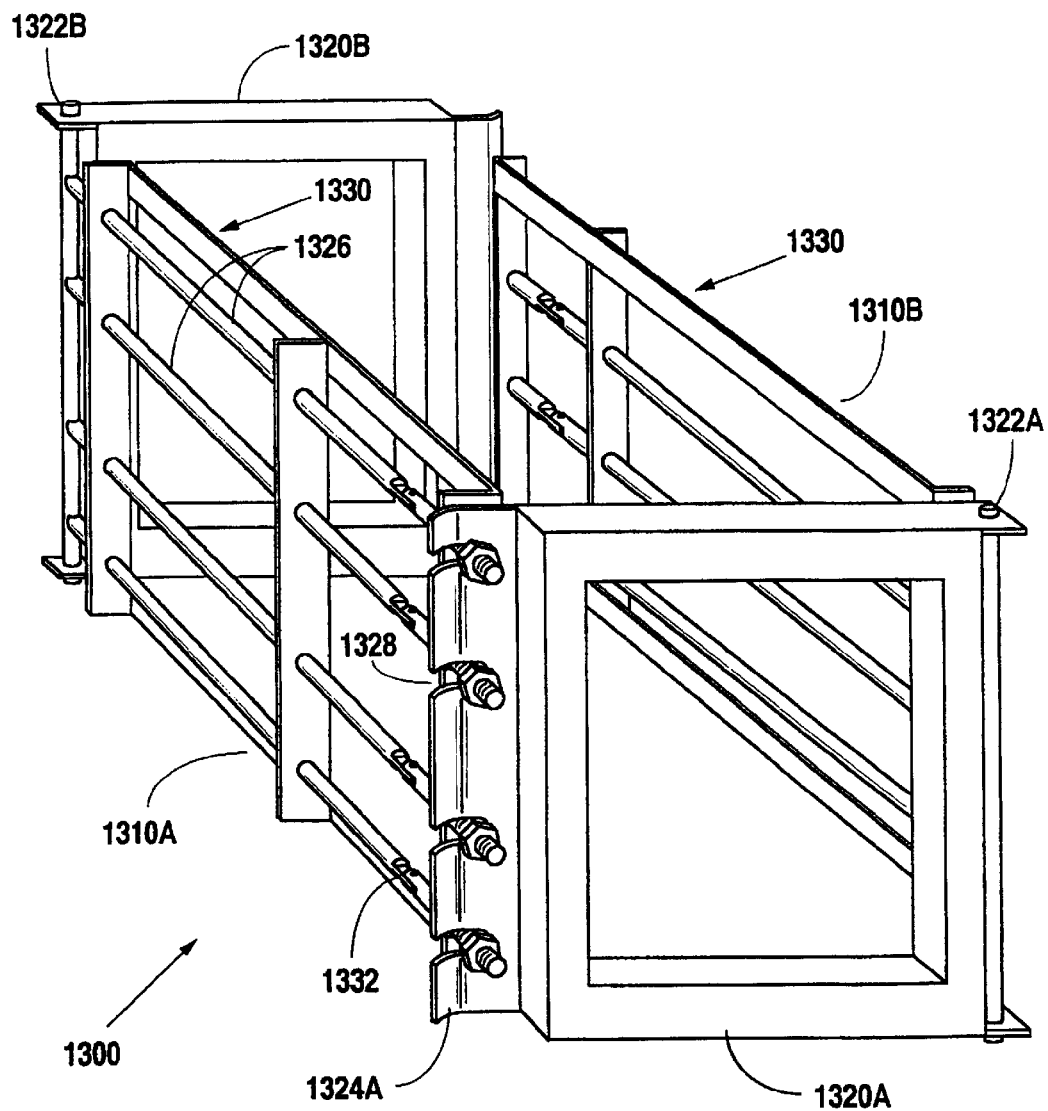
FIGS. 19A and 19B illustrate, in perspective and side elevational views, applicants wall clamping means.
Figure 19B:
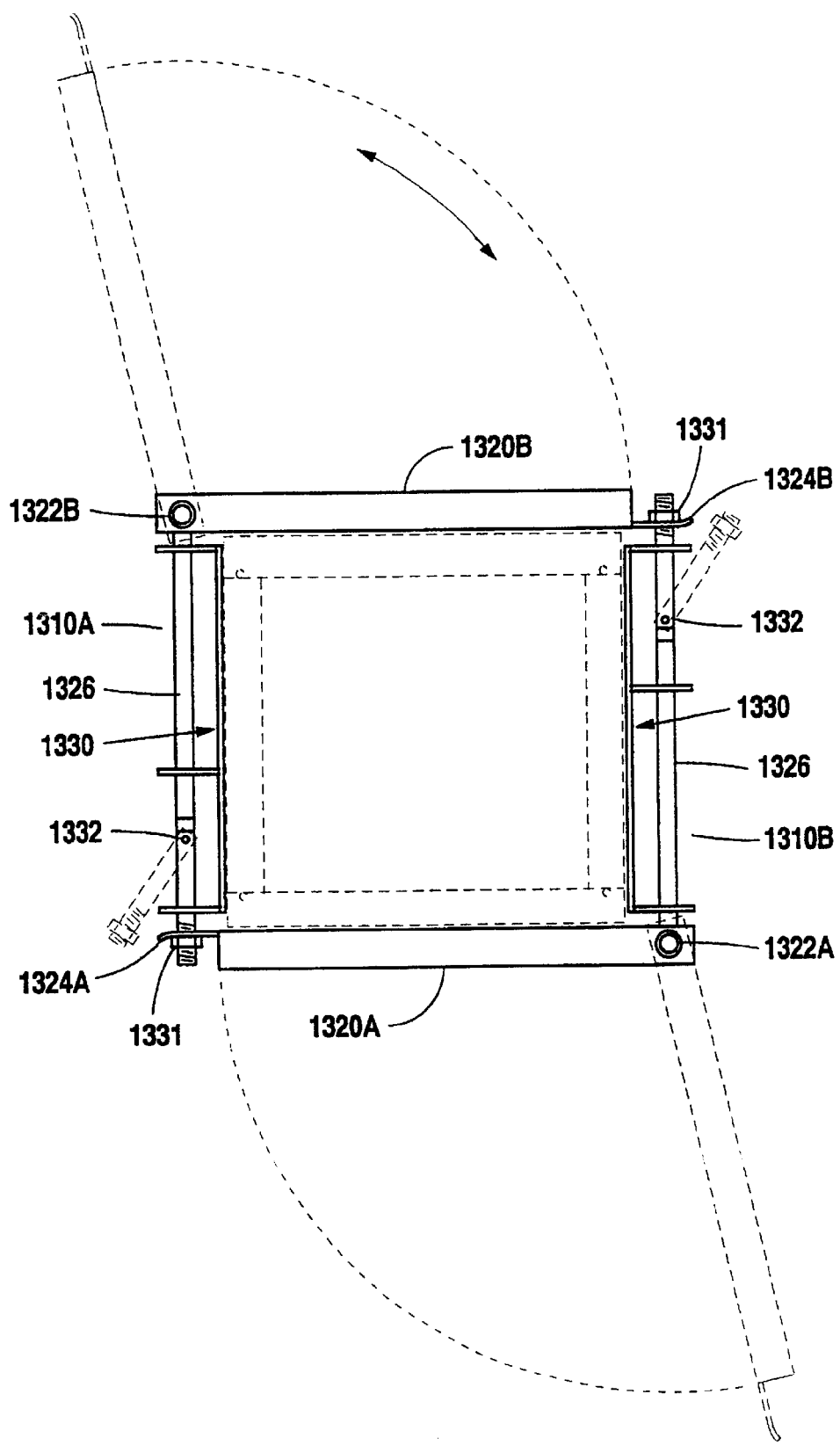

FIGS. 19A and 19B illustrate wall clamping means 1300 for easily releasing the first set of opposing side walls to a permanently fastened and sealed top, bottom, and second set of side walls-all for the ease of sliding the plates in and out of the reactor for periodic maintenance. This clamp is designed to make it easier than undoing all the side wall fasteners. As can be appreciated, it takes some time to unloosen all the side wall fasteners set forth in the earlier embodiments.

Wall clamping means 1300 includes a first portion 1310A and a second portion 1310B, each of the two portions of a similar design which engage one another in a manner as set forth below. Each of the two portions has a gate frame portion, the front gate frame being 1320A and the back gate frame being 1320B. As can be seen in FIG. 19A, the gate frame portions are generally rectangular with a hinge 1322A and 1322B at one end and a tie rod receiving bracket 1324A and 1324B at the other. The hinge articulates at the top and bottom of the front gate portions and has connected, transversely thereto, a number of tie rods 1326. The tie rods engage cut-outs 1328 in the gate frames at the ends of the tie rod opposite the hinges with fasteners 1331 to fasten tight onto the threaded removed ends of the tie rods.

The side walls adjacent the gate frames may include stationary frame 1330 engaging the tie rods in the manner set forth in FIGS. 19A and 19B. Further, it is noted that the tie rods may be hinged at hinge point 1332 so as to help release the tie rods from the stationary gate by folding them back once the nut or other fastener 1331 is loosened (see FIG. 19B).

Thus, Applicants provide a more convenient method for fastening two side walls to four rigid walls (the top, bottom and two opposing side walls), to allow easy access to the interior by removal of a first set of opposing side walls (the ones with the power studs therein) so as to easily remove the plates without having to undo too many fasteners.

Typically, a reactor is rated at a given flow rate and works most efficiently at that flow rate. For example, a 25 GPM electrocoagulation reactor is preferably not run at 10 or 15 gallons per minute. Applicants provide, in FIG. 20, a means for recirculating a portion of the waste water exiting an electrocoagulation reactor and thereby achieving a net flow downstream from the reactor of treated water at a flow rate less than that of the water flowing through the reactor. For example, a flow rate of 25 gallons per minute may be maintained through a reactor with a recirculation loop drawing off part of the water exiting from the electrocoagulation reactor and reintroducing it upstream of the inlet of the electrocoagulation reactor. A net flow of, for example, 10 or 15 gallons per minute of treated water may result while maintaining a given flow rate at 25 gallons per minute through the electrocoagulation reactor. In other words, an overall flow rate of 25 gallons per minute (for example) maybe maintained through the electrocoagulation reactor portion of the system by using a second or recirculation pump as part of a recirculation loop while treating a net amount of waste water equal to, for example, 10 or 15 gallons per minute. The use of a recirculation loop may be done to increase the resident time for a particular waste that needs extra treatment. The alternative would be to have two reactors, two rectifiers etc., which would be costly.

A recirculation loop can be used with any of Applicant's embodiments disclosed herein, in fact with any other electrocoagulation reactor or system. It provides a fairly simple and inexpensive means to maintain a given flow rate through a reactor while increasing the resident time of the waste water in the reactor (compared to a single pass) and, for decreasing the net flow of waste water treated but maintaining a higher flow rate through the reactor. For example, assume upstream pump (1404) is pumping 10 gallons a minute. Reactor (1410) may be a 25 gallon per minute reactor. At this flow rating, there is sufficient flow through the reactor to properly scrub the plates. One can use a recirculation pump (1420) providing flow at the rate of 15 gallons per minute to provide a flow rate through a reactor of 25 gallons per minute. Yet the net treatment rate is 10 gallons per minute of waste water flow downstream from a recirculation junction (1416). In fact, Applicant's may increase the flow rate through a reactor providing a flow rate greater than the rating for the reactor, which flow rate may provide additional water velocity to scrub the plates. For example, a flow rate of 35 gallons per minute may be provided through the reactor while the net waste water treatment may be 25 gpm or less.

Figure 20:
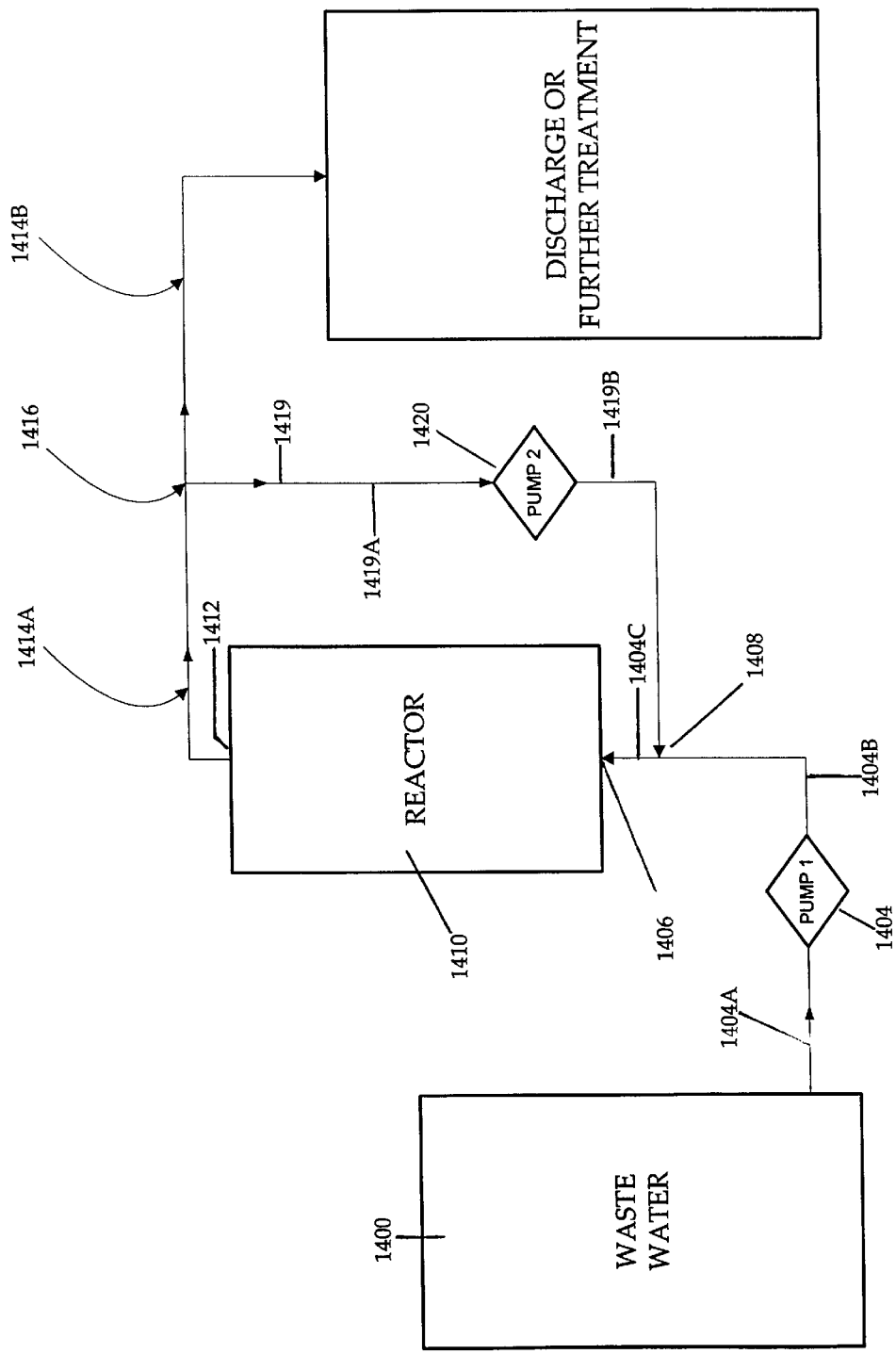
FIG. 20 discloses applicants recirculation loop.

Turning now to FIG. 20, Applicant discloses a vessel (1400) or other source of waste water, the waste water being industrial and/or biological and/or other form of waste water that may contain containments that include organic and/or inorganic compositions. It is seen that there is an intake pipe having several sections (1404A, 1404B and 1404C) for carrying waste water from the waste water source into a reactor (1410), typically an electrocoagulation reactor. In line with the intake pipe is an upstream pump (1404), upstream of the reactor. The intake pipe includes a section (1404A) between the waste water vessel (1400) and the upstream pump (1404). A second section of intake pipe (1404B), is located between the upstream pump (1404) and a T Junction or other junction (1408). Finally there is a section of intake pipe between the T Junction or other junction and an intake port (1406) of the electrocoagulation reactor (1410).

The upstream pump (1404) is used to pressurize the reactor and provide for waste water fluid flow through the reactor. The reactor also has an outlet port (1412) and outlet pipe sections (1414A and 1414B). Waste water leaves the electrocoagulation reactor at outlet port (1412). Some of the waste water will be recirculated by exiting the outlet pipe at recirculation junction (1416), being drawn by a recirculation pump (1420) for example, a positive displacement diaphragm type pump, through recirculation loop (1418A). Recirculation loop (1419) includes pipe section (1419A) upstream of recirculation pump (1420) and recirculation pipe section (1419B) downstream of recirculation pump (1420). Recirculation pipe section (1419B) joins the intake pipe downstream of upstream pump (1404) and upstream of intake port (1406), here at junction (1408)

Thus, applicants provide a method of transporting a quantity of waste water from a removed location to an electrocoagulation reactor, moving the waste water through the electrocoagulation reactor while subjecting the waste water to an electric field, then discharging the waste water from the electrocoagulation reactor through a discharge port. Downstream the discharge port and inline with discharge piping is a recirculation loop that includes a pump for recirculating a portion of the water back into the electrocoagulation reactor by reintroducing the waste water that is already passed through the reactor at least once upstream of the inlet port of the reactor.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. A method for treating waste water, the method comprising the steps of:

providing an electrocoagulation reactor having an intake pipe, the intake pipe having a first pump engaged therewith and an intake port and a discharge pipe and a discharge port, the electrocoagulation reactor including a recirculation loop with a recirculation pump engaged therewith, the recirculation loop engaged with the intake pipe downstream of the first pump and upstream of the intake port;

transporting a quantity of waste water from a distant location to the intake port of the electrocoagulation reactor via the intake pipe and the first pump;

subjecting the waste water in the reactor to an electric field;

moving the waste water through the electrocoagulation reactor;

discharging the waste water from the electrocoagulation reactor to the discharge pipe; and, pumping a portion of the discharged waste water through the recirculation loop and the recirculation pump back into the electrocoagulation reactor upstream thereof.

2. The method of claim 1 further including the step of:

defoaming the waste water discharged from the electrocoagulation reactor.

3. The method of claim 1 further including the step of:

clarifying the waste water discharged from the electrocoagulation reactor.

4. The method of claim 1 further including the step of:

providing a settling tank and allowing the waste water discharged from the electrocoagulation reactor to reside in the settling tank so that any particulate matter may settle out from the waste water.

5. The method of claim 1 further including the steps of providing a sludge thickener downstream of the electrocoagulation reactor and residing the waste water discharged from the electrocoagulation reactor in the sludge thickener for thickening any sludge contained therein.

6. A device for treating waste water, the device including:

an electrocoagulation reactor having an intake pipe engaged with a first pump, an intake port, an outlet pipe and an outlet port; and a recirculation loop having a recirculation pump for taking a portion of the waste water in the outlet pipe and reintroducing it to the inlet pipe downstream of the first pump.

7. The device of claim 6 wherein the recirculation loop includes a pipe for joining the outlet pipe and for joining the inlet pipe downstream of the first pump.

8. The device of claim 6 wherein the first pump is a positive displacement pump.

9. The device of claim 6 wherein the recirculation pump of the recirculation loop is a positive displacement pump.

10. The device of claim 6 for the series flow of water there-between.

11. The device of claim 6 wherein the electrocoagulation reactor has a multiplicity of plates therein for the parallel flow of water there-between.

12. The device of claim 6 wherein the electrocoagulation reactor includes sealed walls for maintaining positive pressure therein.

13. A method for treating wastewater in a system having an electrocoagulation reactor including a first pump upstream of the electrocoagulation reactor and a recirculation loop including a recirculation pump, the recirculation loop for recirculating wastewater discharged from the electrocoagulation reactor back upstream thereof, the method including the steps of:

determining a net wastewater flow rate;

determining an efficient electrocoagulation reactor flow rate;

providing a first pump capable of establishing the net waste water flow rate there-through; and, providing a recirculation pump capable of establishing, in the recirculation loop, a flow rate equal at least to approximately the difference between the electrocoagulation reactor flow rate and the net wastewater flow rate.

14. The method of claim 13 further including the steps of:

running the first pump and the recirulation pump such that the flow through electrocoagulation reactor is at least equal to the efficient electrocoagulation reactor flow rate.

15. The method of claim 13 wherein the step of determining an efficient electrocoagulation flow rate includes determining the minimum flow rate required to keep the plates of the electrocoagulation reactor substantially clean.

16. The method of claim 13 further including the step of:

defoaming the waste water discharged from the electrocoagulation reactor.

17. The method of claim 13 further including the step of:

clarifying the waste water discharged from the electrocoagulation reactor.

18. The method of claim 13 further including the step of:

providing a settling tank and allowing the waste water discharged from the electrocoagulation reactor to reside in the settling tank so that any particulate matter may settle out from the waste water.

19. The method of claim 13 further including the steps of providing a sludge thickener downstream of the electrocoagulation reactor and residing the waste water discharged from the electrocoagulation reactor in the sludge thickener for thickening any sludge contained therein.

* * * * *